(12) United States Patent
Chen et al.

(10) Patent No.: US 12,309,391 B2
(45) Date of Patent: May 20, 2025

(54) SYSTEMS AND METHOD FOR INTER PREDICTION BASED ON A MERGE MODE

(71) Applicant: ZHEJIANG DAHUA TECHNOLOGY CO., LTD., Zhejiang (CN)

(72) Inventors: Yao Chen, Hangzhou (CN); Dong Jiang, Hangzhou (CN); Jucai Lin, Hangzhou (CN); Ruidong Fang, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 102 days.

(21) Appl. No.: 18/304,536

(22) Filed: Apr. 21, 2023

(65) Prior Publication Data

US 2023/0300344 A1 Sep. 21, 2023

Related U.S. Application Data

(63) Continuation of application No. PCT/CN2021/135024, filed on Dec. 2, 2021.

(30) Foreign Application Priority Data

Dec. 2, 2020 (CN) .......................... 202011406071.3
Feb. 22, 2021 (CN) .......................... 202110199497.4

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/109* (2014.11);
(Continued)

(58) Field of Classification Search
CPC .. H04N 19/159; H04N 19/105; H04N 19/109; H04N 19/117; H04N 19/119;
(Continued)

(56) References Cited

U.S. PATENT DOCUMENTS 10,244,235 B2 * 3/2019 Merkle ................ H04N 19/176
2004/0190610 A1 9/2004 Song et al.
(Continued)

FOREIGN PATENT DOCUMENTS

CN 102223528 A 10/2011
CN 110446050 A * 11/2019 ........... H04N 19/182
(Continued)

OTHER PUBLICATIONS

JVET-T2002.*
(Continued)

*Primary Examiner* — Shadan E Haghani
(74) *Attorney, Agent, or Firm* — METIS IP LLC

(57) ABSTRACT

The present disclosure relates to systems and methods for inter prediction based on a Merge mode. The methods may include determining whether a current block in an image frame satisfies a division condition, and in response to determining that the current block satisfies the division condition, obtaining two sub-blocks by dividing the current block according to a division mode. The division mode may include a rectangular division. The methods may further include determine, based on the two sub-blocks, a prediction result of the current block.

12 Claims, 12 Drawing Sheets

100

(51) Int. Cl.
H04N 19/109 (2014.01)
H04N 19/117 (2014.01)
H04N 19/119 (2014.01)
H04N 19/172 (2014.01)
H04N 19/176 (2014.01)
H04N 19/182 (2014.01)
H04N 19/51 (2014.01)
H04N 19/80 (2014.01)

(52) U.S. Cl.
CPC ......... *H04N 19/117* (2014.11); *H04N 19/119* (2014.11); *H04N 19/172* (2014.11); *H04N 19/176* (2014.11); *H04N 19/182* (2014.11); *H04N 19/51* (2014.11); *H04N 19/80* (2014.11)

(58) Field of Classification Search
CPC .. H04N 19/172; H04N 19/176; H04N 19/182; H04N 19/51; H04N 19/80; H04N 19/82
See application file for complete search history.

(56) References Cited

U.S. PATENT DOCUMENTS

| | | | |
|---|---|---|---|
| 2009/0034854 A1 | 2/2009 | Lee et al. | |
| 2010/0189359 A1* | 7/2010 | Gomi | H04N 5/20 382/199 |
| 2011/0200111 A1 | 8/2011 | Chen et al. | |
| 2013/0034167 A1 | 2/2013 | Zheng | |
| 2014/0198846 A1* | 7/2014 | Guo | H04N 19/59 375/240.12 |
| 2017/0041607 A1 | 2/2017 | Song et al. | |
| 2020/0007870 A1 | 1/2020 | Ramasubramonian et al. | |
| 2020/0007878 A1 | 1/2020 | Zhao et al. | |
| 2020/0036991 A1 | 1/2020 | Jiang et al. | |
| 2020/0213584 A1 | 7/2020 | Gamei et al. | |
| 2020/0288150 A1 | 9/2020 | Jun et al. | |
| 2020/0344486 A1* | 10/2020 | Huang | H04N 19/119 |
| 2021/0120242 A1 | 4/2021 | Nam et al. | |
| 2021/0321102 A1 | 10/2021 | Chen | |
| 2021/0385451 A1 | 12/2021 | Zhang et al. | |
| 2022/0070475 A1 | 3/2022 | Lee et al. | |
| 2022/0078403 A1 | 3/2022 | Ahn | |

FOREIGN PATENT DOCUMENTS

| | | | |
|---|---|---|---|
| CN | 111355959 A | 6/2020 | |
| CN | 112585769 A | 3/2021 | |
| CN | 113099229 A | 7/2021 | |
| EP | 2621170 B1 | 4/2016 | |
| EP | 3598757 A1 | 1/2020 | |
| WO | WO-2008127568 A2 * | 10/2008 | ........... H04N 19/103 |
| WO | WO-2011130186 A2 * | 10/2011 | ........... H04N 19/119 |
| WO | WO-2018141416 A1 * | 8/2018 | ........... H04N 19/119 |
| WO | 2020103942 A1 | 5/2020 | |

OTHER PUBLICATIONS

International Search Report in PCT/CN2021/135024 mailed on Mar. 8, 2022, 4 pages.
Written Opinion in PCT/CN2021/135024 mailed on Mar. 8, 2022, 5 pages.
First Office Action in Chinese Application No. 202011406071.3 mailed on Jun. 13, 2022, 17 pages.
Telecommunication Standardization Sector of ITU, ITU-T H.264, 2013, 731 pages.
Telecommunication Standardization Sector of ITU, ITU-T H.265, 2015, 635 pages.
Max Bläser et al., Low-Complexity Geometric Inter-Prediction for Versatile Video Coding, 2019 Picture Coding Symposium (PCS), 2019, 5 pages.
The Extended European Search Report in European Application No. 21900056.9 mailed on Aug. 10, 2023, 8 pages.

* cited by examiner

1:1 2:1 HOR 2:1 1:1 1:2 VER 1:2

Seven prefiction position of reference weight

SYSTEMS AND METHOD FOR INTER PREDICTION BASED ON A MERGE MODE

CROSS-REFERENCE TO RELATED APPLICATIONS

This application is a continuation of International Application No. PCT/CN2021/135024, filed on Dec. 2, 2021, which claims priority of Chinese Patent Application No. 202011406071.3, filed on Dec. 2, 2020, and Chinese Patent Application No. 202110199497.4, filed on Feb. 22, 2021, the contents of each of which are hereby incorporated by reference.

TECHNICAL FIELD

The present disclosure relates to video data processing, and in particular, to a system and a method for inter prediction based on a Merge mode.

BACKGROUND

Videos, due to their large data volume, usually need to be encoded to obtain compressed data. The compressed data may be referred to as a video code stream. The video code stream may be transmitted to a user terminal via a wired or a wireless network and further decoded for display. A video encoding process may include prediction, transformation, quantization, entropy encoding, or the like. The prediction includes an intra prediction and an inter prediction. In the inter prediction, time-domain correlation between image frames may be used to compress the image frames. However, current inter prediction methods may affect the accuracy and efficiency of inter prediction.

Therefore, it is desirable to provide a method for inter prediction based on a Merge mode to improve the accuracy and efficiency of the inter prediction.

SUMMARY

An aspect of the present disclosure relates to a system for inter prediction based on a Merge mode. The system may include at least one storage medium including a set of instructions and at least one processor in communication with the at least one storage medium. When executing the set of instructions, the at least one processor may be directed to cause the system to determine whether a current block in an image frame satisfies a division condition, in response to determining that the current block satisfies the division condition, obtain two sub-blocks by dividing the current block according to a division mode. The division mode may include a rectangular division. The at least one processor may be directed to cause the system further to determine, based on the two sub-blocks, a prediction result of the current block.

In some embodiments, the rectangular division may be converted from an inclined division.

In some embodiments, to obtain the two sub-blocks by dividing the current block according to a division mode, the at least one processor may be directed to obtain two intermediate sub-blocks by dividing the current block according to the inclined division, determine a count of pixels of at least one of the two intermediate sub-blocks, and obtain the two sub-blocks by converting the inclined division of the current block into the rectangular division of the current block based on the count of pixels.

In some embodiments, to obtain the two sub-blocks by dividing the current block according to a division mode, the at least one processor may be directed to obtain two intermediate sub-blocks by dividing the current block according to the inclined division, determine a dividing point between the two intermediate sub-blocks, and obtain the two sub-blocks by converting the inclined division of the current block into the rectangular division of the current block based on the dividing point between the two intermediate sub-blocks.

In some embodiments, to determine, based on the two sub-blocks, a prediction result of the current block, the at least one processor may be directed to cause the system further to obtain motion compensation information of the two sub-blocks by performing, based on the rectangular division, a motion compensation on the two sub-blocks, determine, based on the motion compensation information and the inclined division, target prediction values of the two sub-blocks, and determine, based on the target prediction values of the two sub-blocks, the prediction result of the current block.

In some embodiments, to determine, based on the two sub-blocks, a prediction result of the current block, the at least one processor may be directed to cause the system further to obtain two predicted sub-blocks corresponding to the two sub-blocks, obtain filtered pixel values by performing a first filtering operation on pixel values at a junction region of the two predicted sub-blocks, designate the filtered pixel values as target prediction values of the two predicted sub-blocks, and determine, based on the target prediction values of the two sub-blocks, the prediction result of the current block.

In some embodiments, to obtain filtered pixel values of the two predicted sub-blocks by performing a first filtering operation on pixel values at a junction of the two predicted sub-blocks, the at least one processor may be directed to cause the system to filter, based on a tap filter, the pixel values at the junction of the two predicted sub-blocks. Coefficients of the tap filter may include {1, 2, 1}.

In some embodiments, to obtain two predicted sub-blocks corresponding to the two sub-blocks, the at least one processor may be directed to cause the system to obtain motion compensation information of the two sub-blocks by performing, based on the rectangular division, a motion compensation on the two sub-blocks; determine, based on the motion compensation information and the inclined division, target prediction values of the two sub-blocks; obtain two updated sub-blocks corresponding to the two sub-blocks by performing, based on the target prediction values of the two sub-blocks, a second filter operation on the two sub-blocks, and designate the two updated sub-blocks as the two predicted sub-blocks.

In some embodiments, the division mode may include at least one of a horizontal division, a vertical division, a diagonal division, or the like, or any combination thereof.

In some embodiments, the division mode may be adjustable according to operations including adjusting an effective length of a reference weight matrix in the division mode, and adjusting the division mode based on the adjusted effective length.

In some embodiments, offset directions of the division mode may include up, down, left, right, upper left, upper right, lower left, lower right, or the like, or any combination thereof.

In some embodiments, offset distances of the division mode may include ¼ pixel accuracy, ½ pixel accuracy, 1 pixel accuracy, 2 times of pixel accuracy, 4 times of pixel accuracy, 8 times of pixel accuracy, 16 times of pixel accuracy, 32 times of pixel accuracy, or the like, or any combination thereof.

In some embodiments, the system may be applied to the third generation audio video coding standard (AVS3).

In some embodiments, the division mode may include a plurality of division manners. Each of the plurality of division manners may correspond to two candidate sub-blocks. To obtain two sub-blocks by dividing the current block according to a division mode, the at least one processor may be directed to cause the system to for each two candidate sub-blocks corresponding to one of the plurality of division manners, obtain motion compensation information of the two candidate sub-blocks by performing, based on the rectangular division, a motion compensation on the two candidate sub-blocks, determine target motion compensation information in the motion compensation information corresponding to the plurality of division manners, and designate two candidate sub-blocks corresponding to the target motion compensation information as the two sub-blocks.

In some embodiments, the plurality of division manners may correspond to a plurality of step sizes. The plurality of step sizes may relate to division differences between the plurality of division manners.

Another aspect of the present disclosure relates to a method for inter prediction based on a Merge mode. The method may be implemented on a computing device including at least one processor and at least one storage. The method may include determining whether a current block in an image frame satisfies a division condition, and in response to determining that the current block satisfies the division condition, obtaining two sub-blocks by dividing the current block according to a division mode. The division mode may include a rectangular division. The method may further include determining, based on the two sub-blocks, a prediction result of the current block.

In some embodiments, the rectangular division may be converted from an inclined division.

In some embodiments, the obtaining the two sub-blocks by dividing the current block according to a division mode may include obtaining two intermediate sub-blocks by dividing the current block according to the inclined division, determining a count of pixels of at least one of the two intermediate sub-blocks, and obtaining the two sub-blocks by converting the inclined division of the current block into the rectangular division of the current block based on the count of pixels.

In some embodiments, the obtaining the two sub-blocks by dividing the current block according to a division mode may include obtaining two intermediate sub-blocks by dividing the current block according to the inclined division, determining a dividing point between the two intermediate sub-blocks, and obtaining the two sub-blocks by converting the inclined division of the current block into the rectangular division of the current block based on the dividing point between the two intermediate sub-blocks.

In some embodiments, the determining, based on the two sub-blocks, a prediction result of the current block may include obtaining motion compensation information of the two sub-blocks by performing, based on the rectangular division, a motion compensation on the two sub-blocks, determining, based on the motion compensation information and the inclined division, target prediction values of the two sub-blocks, and determining, based on the target prediction values of the two sub-blocks, the prediction result of the current block.

In some embodiments, the determining, based on the two sub-blocks, a prediction result of the current block may include obtaining two predicted sub-blocks corresponding to the two sub-blocks, obtaining filtered pixel values by performing a first filtering operation on pixel values at a junction region of the two predicted sub-blocks, designating the filtered pixel values as target prediction values of the two predicted sub-blocks, and determining, based on the target prediction values of the two sub-blocks, the prediction result of the current block.

In some embodiments, the obtaining filtered pixel values of the two predicted sub-blocks by performing a first filtering operation on pixel values at a junction of the two predicted sub-blocks may include filtering, based on a tap filter, the pixel values at the junction of the two predicted sub-blocks, wherein coefficients of the tap filter include {1, 2, 1}.

In some embodiments, the obtaining two predicted sub-blocks corresponding to the two sub-blocks may include obtaining motion compensation information of the two sub-blocks by performing, based on the rectangular division, a motion compensation on the two sub-blocks, determining, based on the motion compensation information and the inclined division, target prediction values of the two sub-blocks, obtaining two updated sub-blocks corresponding to the two sub-blocks by performing, based on the target prediction values of the two sub-blocks, a second filter operation on the two sub-blocks, and designating the two updated sub-blocks as the two predicted sub-blocks.

In some embodiments, the division mode may include at least one of a horizontal division, a vertical division, a diagonal division, or the like, or any combination thereof.

In some embodiments, the division mode may be adjustable according to operations including adjusting an effective length of a reference weight matrix in the division mode, and adjusting the division mode based on the adjusted effective length.

In some embodiments, offset directions of the division mode may include up, down, left, right, upper left, upper right, lower left, lower right, or the like, or any combination thereof.

In some embodiments, offset distances of the division mode include ¼ pixel accuracy, ½ pixel accuracy, 1 pixel accuracy, 2 times of pixel accuracy, 4 times of pixel accuracy, 8 times of pixel accuracy, 16 times of pixel accuracy, 32 times of pixel accuracy, or the like, or any combination thereof.

In some embodiments, the method may be applied to the third generation audio video coding standard (AVS3).

In some embodiments, the division mode may include a plurality of division manners. Each of the plurality of division manners may correspond to two candidate sub-blocks. The obtaining two sub-blocks by dividing the current block according to a division mode may include for each two candidate sub-blocks corresponding to one of the plurality of division manners, obtaining motion compensation information of the two candidate sub-blocks by performing, based on the rectangular division, a motion compensation on the two candidate sub-blocks, determining target motion compensation information in the motion compensation information corresponding to the plurality of division manners, and designating two candidate sub-blocks corresponding to the target motion compensation information as the two sub-blocks.

In some embodiments, the plurality of division manners may correspond to a plurality of step sizes. The plurality of step sizes may relate to division differences between the plurality of division manners.

A further aspect of the present disclosure relates to a system for inter prediction based on a Merge mode. The system may include a division condition determination module, an obtaining module, and a prediction result determination module. The division condition determination module may be configured to determine whether a current block in an image frame satisfies a division condition. The obtaining module may be configured to in response to determining that the current block satisfies the division condition, obtain two sub-blocks by dividing the current block according to a division mode. The division mode may include a rectangular division. The prediction result determination module may be configured to determine, based on the two sub-blocks, a prediction result of the current block.

In some embodiments, the rectangular division may be converted from an inclined division.

In some embodiments, to obtain the two sub-blocks by dividing the current block according to a division mode, the obtaining module may be configured to obtain two intermediate sub-blocks by dividing the current block according to the inclined division, determine a count of pixels of at least one of the two intermediate sub-blocks, and obtain the two sub-blocks by converting the inclined division of the current block into the rectangular division of the current block based on the count of pixels.

In some embodiments, to obtain the two sub-blocks by dividing the current block according to a division mode, the obtaining module may be configured to obtain two intermediate sub-blocks by dividing the current block according to the inclined division, determine a dividing point between the two intermediate sub-blocks, and obtain the two sub-blocks by converting the inclined division of the current block into the rectangular division of the current block based on the dividing point between the two intermediate sub-blocks.

In some embodiments, to determine, based on the two sub-blocks, a prediction result of the current block, the prediction result determination module may be configured to obtain motion compensation information of the two sub-blocks by performing, based on the rectangular division, a motion compensation on the two sub-blocks, determine, based on the motion compensation information and the inclined division, target prediction values of the two sub-blocks, and determine, based on the target prediction values of the two sub-blocks, the prediction result of the current block.

In some embodiments, to determine, based on the two sub-blocks, a prediction result of the current block, the prediction result determination module may be configured further to obtain two predicted sub-blocks corresponding to the two sub-blocks, obtain filtered pixel values by performing a first filtering operation on pixel values at a junction region of the two predicted sub-blocks, designate the filtered pixel values as target prediction values of the two predicted sub-blocks, and determine, based on the target prediction values of the two sub-blocks, the prediction result of the current block.

In some embodiments, to obtain filtered pixel values of the two predicted sub-blocks by performing a first filtering operation on pixel values at a junction of the two predicted sub-blocks, the prediction result determination module may be configured to filter, based on a tap filter, the pixel values at the junction of the two predicted sub-blocks, wherein coefficients of the tap filter include {1, 2, 1}.

In some embodiments, to obtain two predicted sub-blocks corresponding to the two sub-blocks, the prediction result determination module may be configured to obtain motion compensation information of the two sub-blocks by performing, based on the rectangular division, a motion compensation on the two sub-blocks, determine, based on the motion compensation information and the inclined division, target prediction values of the two sub-blocks, obtain two updated sub-blocks corresponding to the two sub-blocks by performing, based on the target prediction values of the two sub-blocks, a second filter operation on the two sub-blocks, and designate the two updated sub-blocks as the two predicted sub-blocks.

In some embodiments, the division mode includes a horizontal division, a vertical division, a diagonal division, or the like, or any combination thereof.

In some embodiments, the division mode may be adjustable according to operations including adjusting an effective length of a reference weight matrix in the division mode, and adjusting the division mode based on the adjusted effective length.

In some embodiments, offset directions of the division mode may include up, down, left, right, upper left, upper right, lower left, lower right, or the like, or any combination thereof.

In some embodiments, offset distances of the division mode may include ¼ pixel accuracy, ½ pixel accuracy, 1 pixel accuracy, 2 times of pixel accuracy, 4 times of pixel accuracy, 8 times of pixel accuracy, 16 times of pixel accuracy, 32 times of pixel accuracy, or the like, or any combination thereof.

In some embodiments, the system may be applied to the third generation audio video coding standard (AVS3).

In some embodiments, the division mode may include a plurality of division manners. Each of the plurality of division manners may correspond to two candidate sub-blocks. To obtain two sub-blocks by dividing the current block according to a division mode, the obtaining module may be configured to for each two candidate sub-blocks corresponding to one of the plurality of division manners, obtain motion compensation information of the two candidate sub-blocks by performing, based on the rectangular division, a motion compensation on the two candidate sub-blocks, determine target motion compensation information in the motion compensation information corresponding to the plurality of division manners, and designate two candidate sub-blocks corresponding to the target motion compensation information as the two sub-blocks.

In some embodiments, the plurality of division manners may correspond to a plurality of step sizes. The plurality of step sizes may relate to division differences between the plurality of division manners.

A further aspect of the present disclosure may relate to non-transitory computer readable medium. The non-transitory computer readable medium may include executable instructions that, when executed by at least one processor, direct the at least one processor to perform a method. The method may include determining whether a current block in an image frame satisfies a division condition, and in response to determining that the current block satisfies the division condition, obtaining two sub-blocks by dividing the current block according to a division mode. The division mode may include a rectangular division. The method may further include determining, based on the two sub-blocks, a prediction result of the current block.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
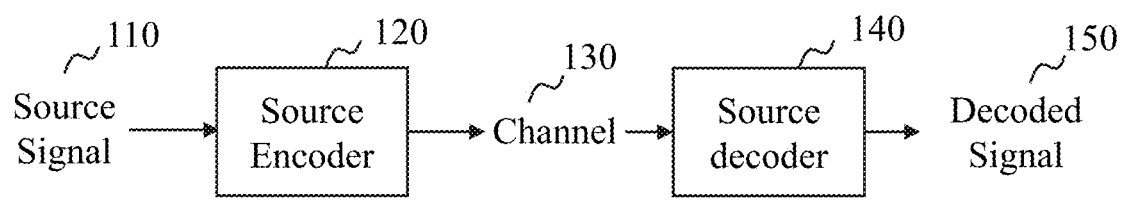
FIG. 1 is a schematic diagram illustrating an exemplary frame prediction system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "unit" used herein refers to a basic unit of image processing or a specific position of an image, or refer to an image region including a luma component and/or a chroma component. In addition, the term "block" refers to an image region including a specific component in the luma component and/or a chroma component (i.e., chrominance-blue (Cb) and chrominance-red (Cr)). In some embodiments, the terms "unit," "block," "partition," and "region" in the present disclosure are used interchangeably. Furthermore, the unit in the present disclosure can be used as all concepts including a compilation unit, a prediction unit and a transformation unit. Images in the present disclosure refer to spot or frame. In some embodiments, the terms "image," "spot," and "frame" are used interchangeably. However, the terms may be displaced by other expressions if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

FIG. 1 is a schematic diagram illustrating an exemplary frame prediction system according to some embodiments of the present disclosure.

In some embodiments, a frame prediction system 100 based on a Merge mode may be provided for frame prediction. The frame prediction system 100 may be applied to a digital image or video compression system, such as an aerial television broadcasting system, a cable television transmission system, a satellite television transmission system, an internet video transmission system, a digital video stored in media, etc. The image or video compression may refer to a process for reducing the amount of data required to present a digital image or a video, which aims to reduce redundant information in image or video data so as to store or transmit data effectively.

As shown in FIG. 1, the frame prediction system 100 may include a source signal 110, a source encoder 120, a channel 130, a source decoder 140, and a decoded signal 150.

In some embodiments, the source signal 110 may include source image data. In some embodiments, the source image data may refer to uncompressed original image data that has not been processed by a digital image editing and compression application. The source image data may include one or more source images, a source video, etc. A source image may include a video tape, a laser disk, a dynamic script, a digital image file, or the like, or any combination thereof. The source video may refer to uncompressed dynamic images, and a storage format of the source video may include a digital video format.

In some embodiments, the source encoder 120 may refer to a signal compression standard completed by a software and/or hardware applications. The source encoder 120 may be used to a source signal (e.g., a source image, a source video) at a sending end to obtain an encoded source signal.

In some embodiments, the frame prediction system 100 may also include a channel encoder. The channel encoder may refer to a device or program that may further encode an encoded source signal at the sending end before channel transmission. The channel encoder may be configured to perform an error correction.

In some embodiments, the channel 130 may transmit or store encoded image/video data. The channel 130 may include a wireless channel, a wired channel, or a frequency band. The channel 130 may include a twisted pair, a cable, an optical fiber, or a medium that may propagate electromagnetic waves.

In some embodiments, the encoded image data may be stored in a storage device (e.g., a hard disk), and the encoded image data may be read from the storage device during a subsequent decoding processing process.

In some embodiments, the transformation system 100 may include a channel decoder. The channel decoder may be configured at a receiving end to detect and correct an error in data transmission. The encoded source signal may be unzipped by a source decoder 140.

In some embodiments, the source decoder 140 may refer to a signal compression standard completed by software or hardware applications. The source decoder 140 may be configured to generate an approximation of the source signal (e.g., a source image or a source video) in a decoding end for playback. For example, the source decoder 140 may be configured to obtain an approximation of the source signal by decoding the encoded source signal.

In some embodiments, the decoded signal 150 may refer to data reconstructed from the source signal 110 after being encoded and decoded. The decoded signal 150 may include image data after being compressed and decompressed.

It should be noted that the above description of the frame prediction system is merely provided for the purposes of illustration, and not intended to limit the scope of the present disclosure. It should be understood that for persons having ordinary skills in the art, after understanding the principles of the system, various components may be combined arbitrarily, or a subsystem may be formed to connect with other components without departing from the principles.

For a video signal that includes multiple images (also referred to as frames or image frames), a large spatial correlation between adjacent pixels may exist in an image (e.g., an image frame of the video signals) and a larger temporal correlation may involve between adjacent images (e.g., adjacent image frames of the video signal). In some embodiments, the amount of data in a data transmission process may be reduced based on the spatial correlation and/or temporal correlation.

Prediction techniques in frame prediction system 100 may include an intra prediction and an inter prediction. A predicted pixel value may be obtained based on the prediction techniques. A difference between an original pixel value and the predicted pixel value through prediction may be referred to as a prediction residual. The predicted pixel value may be a predicted pixel value of a current block in an image frame determined based on a reference pixel.

Figures 2A, 2B:
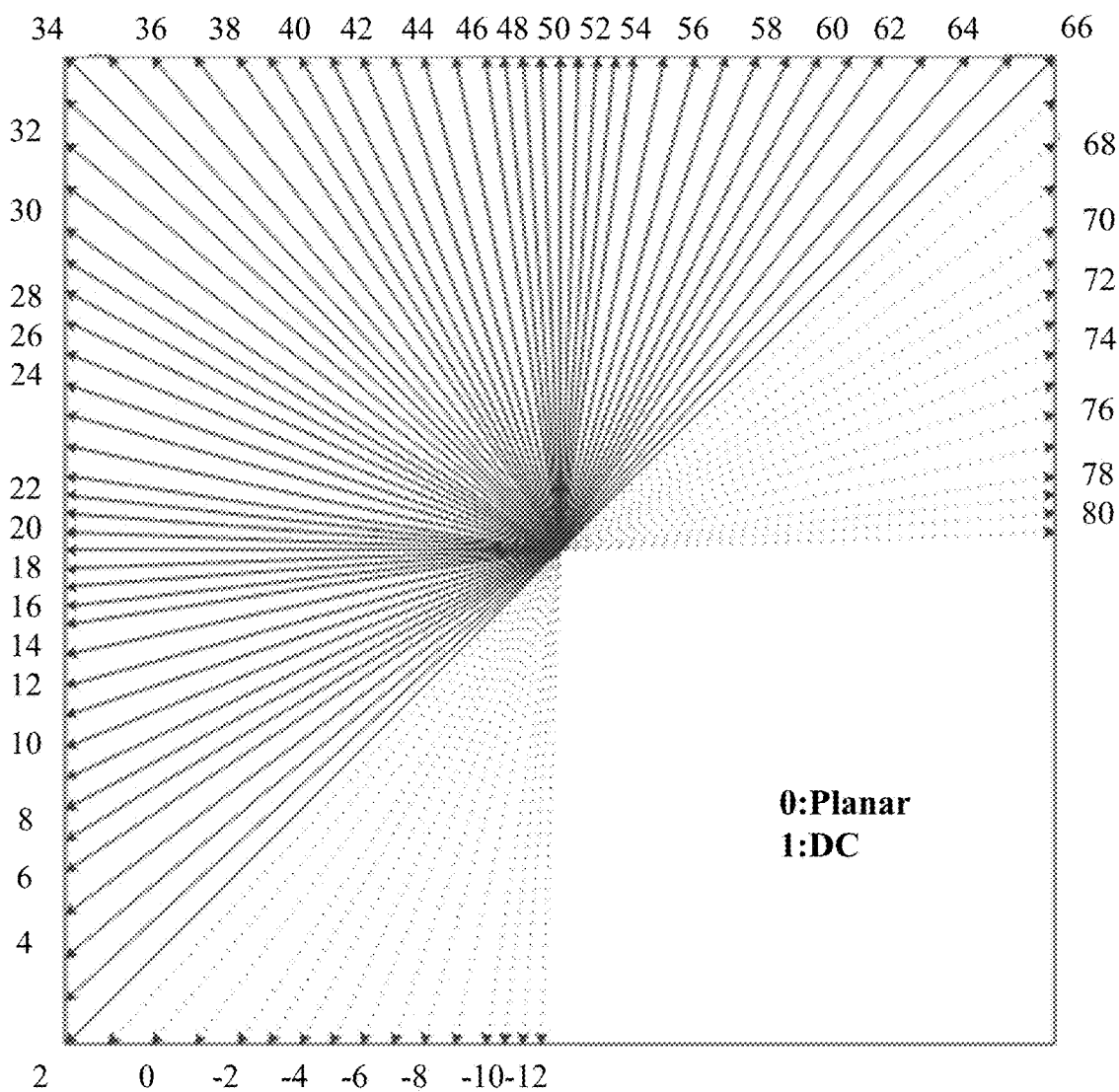
FIG. 2A is a schematic diagram illustrating exemplary intra prediction according to some embodiments of the present disclosure.
FIG. 2B is a schematic diagram illustrating exemplary inter prediction according to some embodiments of the present disclosure.

FIG. 2A is a schematic diagram illustrating an exemplary intra prediction according to some embodiments of the present disclosure.

In some embodiments, signal values corresponding a luma component and/or a chroma component of adjacent pixels in an image frame may be relatively close to each other and may have a large correlation. Data obtained by directly encoding the image frame may include spatially redundant data. The redundant data may be removed before the image frame is encoded. For example, an average count of bits representing each pixel may be decreased to reduce spatially redundant data in a compression of the image. The intra prediction may include operations including dividing prediction blocks (also referred to as "sub-block"), obtaining reference pixels, selecting prediction modes, filtering prediction values, or the like.

Exemplary prediction modes in the intra prediction may include a planar mode, a Direct current (DC) mode, and a multi-angle mode. In the intra prediction, modes 2~N indicate angular modes in the multi-angle mode. The planar mode and the DC mode may be non-angular mode. As shown in FIG. 2A, taking N as 66 as an example, modes 2~66 may be angular modes, modes—13~1 and modes 67~81 may be wide-angle modes, and mode 18 and mode 50 may be modes in a horizontal direction and a vertical direction, respectively. In the prediction modes in the intra prediction, a correlation between blocks in the same frame may be used to determine a final prediction value according to different prediction modes.

FIG. 2B is a schematic diagram illustrating an exemplary inter prediction according to some embodiments of the present disclosure. In the inter prediction, an image frame of a video to be compressed may be divided into blocks. A best matching block closest to a current block in a reference frame may be determined through motion searching. Further, motion information between the current block and the best matching block may be recorded. Exemplary motion information may include a motion vector (MV) and a reference frame index. At a sending end, an encoder (e.g., the source encoder 120) may encode the motion information and transmit the encoded motion information to a decoding end. At the decoding end, a decoder (e.g., the source decoder 140) may obtain the MV of the current block by parsing the encoded motion information based on corresponding syntax elements. In such cases, the best matching block of the current block may be determined. Pixel values of the best matching block may be designated as prediction values of the current block.

The inter prediction mode may include a Merge mode. In the Merge mode, an MV candidate list may be constructed, and a target candidate MV may be determined from the MV candidate list as an MV of the current block. For example, the MV candidate list may include a plurality of candidate MVs. For each candidate MV, a prediction value of the current block may be obtained by performing, based on the candidate MV, a motion compensation on the current block. The prediction values determined based on the plurality of candidate MVs may be compared with an original value of the current block to determine a target candidate MV with the lowest cost. The target candidate MV may be determined as an MV of the current block. An index value of the MV with the lowest cost may be encoded. The encoded index value may be transmitted to the decoding end. Then a reconstruction value of the current block may be obtained by performing, based on the MV corresponding to the index value, a motion compensation.

Figure 3:
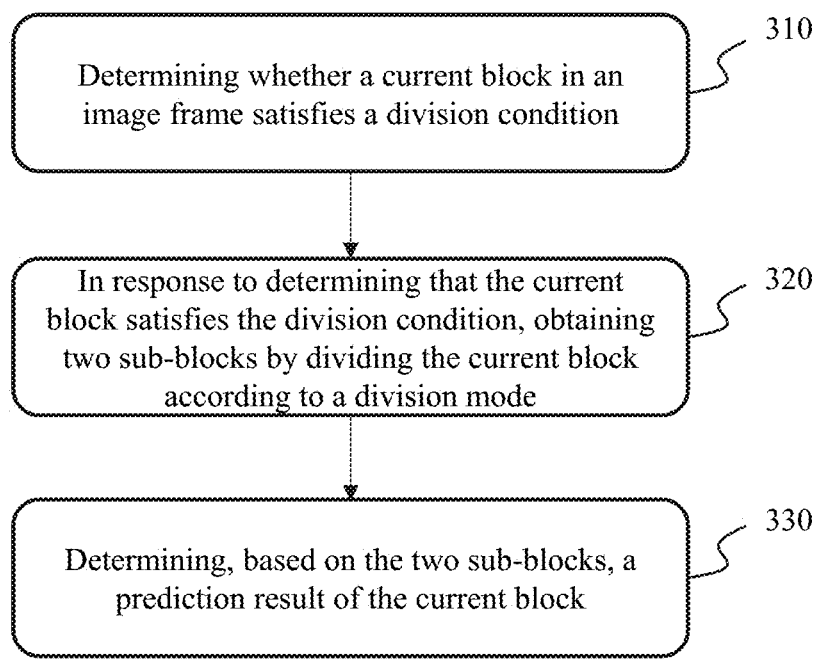
FIG. 3 is a flowchart illustrating an exemplary process for inter prediction according to some embodiments of the present disclosure.

FIG. 3 is a flowchart illustrating an exemplary process for inter prediction according to some embodiments of the present disclosure. In some embodiments, the process 300 may be implemented by a frame prediction system (e.g., the frame prediction system 100). In some embodiments, the frame prediction system may be implemented by software and/or hardware, and/or may be integrated in a frame prediction device (e.g., the frame prediction device 1300 shown in FIG. 13) that includes a processing device (e.g., the processing device 1310). In some embodiments, at least part of process 300 may be performed by the processing device including at least one processor and a storage device. For example, the process 300 may be stored in the storage device in the form of instructions (e.g., an application), and invoked and/or executed by the processing device (e.g., one or more modules or units illustrated in FIG. 14). The operations of the illustrated process presented below are intended to be illustrative. In some embodiments, the process 300 may be accomplished with one or more additional operations not described, and/or without one or more of the operations discussed. Additionally, the order in which the operations of the process 300 as illustrated in FIG. 3 and described below is not intended to be limiting.

Figure 14:
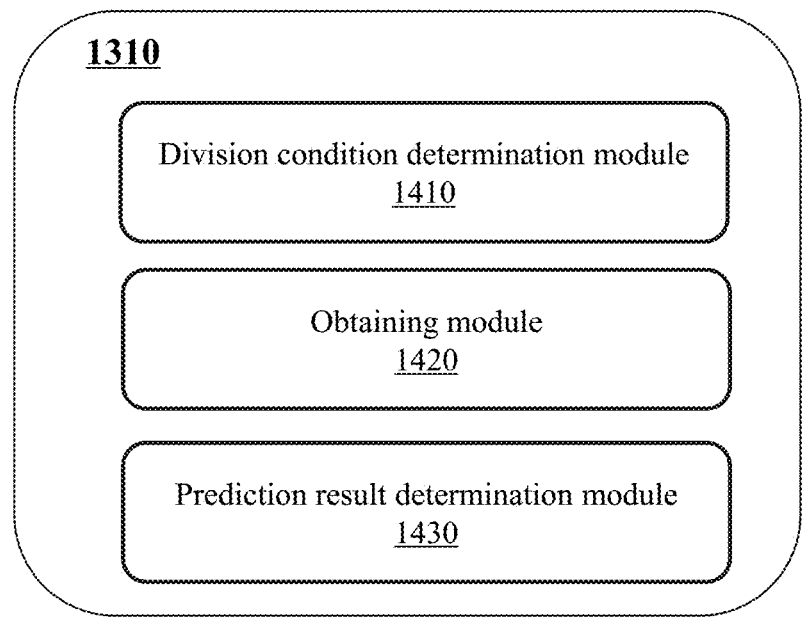
FIG. 14 is a block diagram illustrating an exemplary processing device according to some embodiments of the present disclosure.

In 310, the processing device 1310 (e.g., a division condition determination module 1410 illustrated in FIG. 14) may determine whether a current block in an image frame satisfies a division condition. In some embodiments, the image frame may be a current frame in a video that is to be compressed and includes multiple image frames. In some embodiments, the image frame may be a current image in an image sequence that is to be compressed and includes or more images. In the inter prediction, the image frame may be divided into one or more blocks for further processing. For the current block, the processing device may determine whether the current block satisfies the division condition.

The division condition refers to a condition for dividing the current block if the condition is satisfied. When the video is coded, a group of pictures (GOP) may be used to specify types of the image frames. Exemplary types in the GOP may include an I frame, a P frame, a B frame, or the like. As used herein, the I frame refers to a frame that is coded independently of other frames of the video or the image sequence. The P frame and B frame may be coded based on other frames. In some embodiments, the division condition may be that a width and/or a height of the current block is in a range from M to N (M<N) when the image frame is not an I frame. For example, the division condition may be that the width and/or the height of the current block is in a range from 8 to 128 when the image frame is not an I frame. As another example, the division condition may be that the width and/or the height of the current block is in a range from 16 to 64 when the image frame is not an I frame. As another example, the division condition may be that the width and/or the height of the current block is in a range from 16 to 128 when the image frame is not an I frame. As a further example, the division condition may be that the width and/or height of the current block is in a range from 64 to 168.

Merely by way of example, the processing device may determine a type of the image frame based on the GOP. For the image frame that is not the I frame (e.g., a P frame, a B frame, etc.), the processing device may determine whether the width and/or the height is in the range from M to N. In response to determining that the width and/or the height is in the range from M to N, the processing device may determine that the current block satisfies the division condition.

In 320, in response to determining that the current block satisfies the division condition, the processing device 1310 (e.g., an obtaining module 1420 illustrated in FIG. 14) may obtain two sub-blocks by dividing the current block according to a division mode.

Figure 4A:
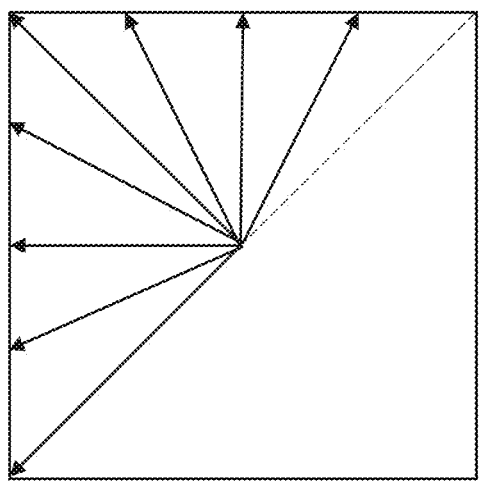
FIG. 4A is a schematic diagram illustrating exemplary prediction angles according to some embodiments of the present disclosure.
Figure 4B:
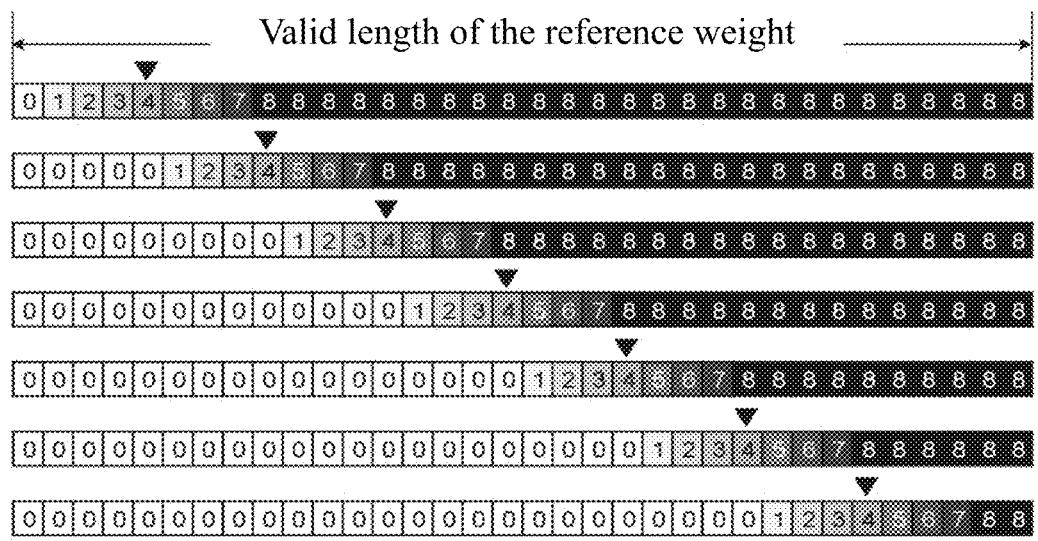
FIG. 4B is a schematic diagram illustrating exemplary reference weight sets according to some embodiments of the present disclosure.

In some embodiments, the division mode may be associated with the weight matrix, and the current block may be divided into the two sub-blocks based on the weight matrix. The weight matrix of the current block may be determined based on an angular weighted prediction (AWP) technique. The weight matrix of the current block may include a reference weight set including multiple weights. FIG. 4A is a schematic diagram illustrating exemplary prediction angles in the AWP technique according to some embodiments of the present disclosure. FIG. 4B is a schematic diagram illustrating exemplary reference weight sets in the AWP technique according to some embodiments of the present disclosure. As shown in FIG. 4A, in the AWP technique, eight prediction angles may be used to determine the weight matrix. Each prediction angle may correspond to seven reference weight sets as shown in FIG. 4B. In such cases, 56 AWP modes may be used for dividing the current block in a size based on the AWP technique.

In some embodiments, an AWP mode of the 56 AWP modes may be determined as a current AWP mode for dividing the current block. For example, the current AWP mode may be determined from the 56 AWP modes according to a certain order. As another example, the 56 AWP modes may include horizontal AWP modes, vertical AWP modes and diagonal AWP modes. A total count of the horizontal AWP modes, the vertical AWP modes and the diagonal AWP modes may be 28. The current AWP mode may be determined from the 28 AWP modes according to a certain order such that types of AWP modes used in the inter prediction may be reduced, which may reduce a computational complexity and improve the coding efficiency. As a further example, a total count of the horizontal AWP modes and the vertical AWP modes may be 14. The current AWP mode may be determined from the 14 AWP modes according to a certain order such that types of AWP modes used in the inter prediction may be reduced, which may reduce a computational complexity and improve the coding efficiency. In some embodiments, during decoding, the current AWP mode of the current block may be obtained from a code stream generated by encoding the video. The target AWP mode may be used as an AWP mode for decoding a current block.

Figure 5:
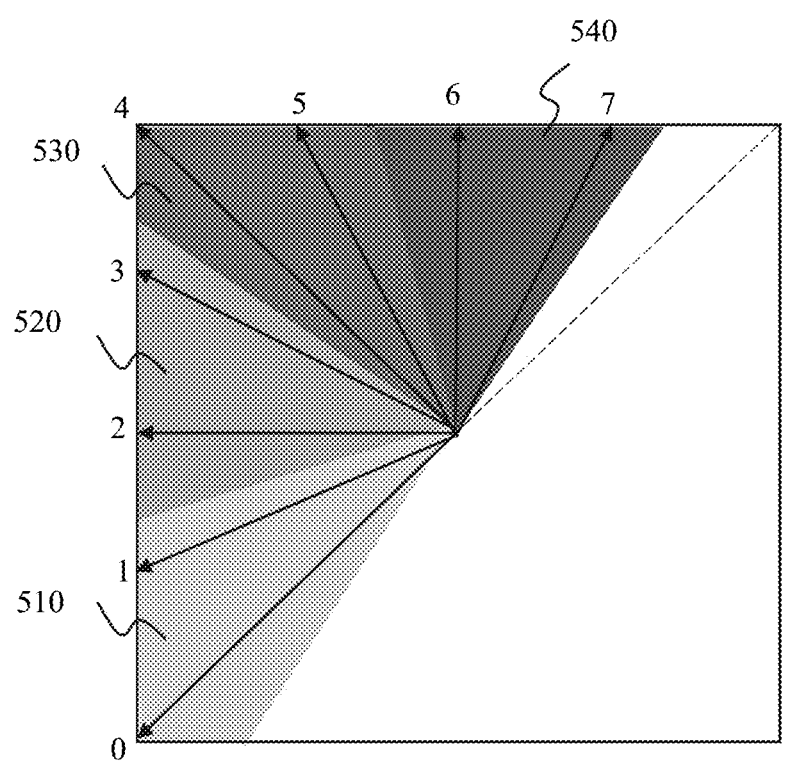
FIG. 5 is a schematic diagram illustrating exemplary division regions according to some embodiments of the present disclosure.

In some embodiments, the weight matrix of the current block corresponding to the current AWP mode may be determined. The weight matrix may be determined based on the current AWP mode by deriving weights pixel by pixel. For example, the current block may include one or more luma blocks and one or more chroma blocks (e.g., a luma block and two chroma blocks). A weight matrix of a luma block of the current block may relate to a division region in which the prediction angle used in the current AWP mode is located. FIG. 5 is a schematic diagram illustrating exemplary division regions according to some embodiments of the present disclosure. As shown in FIG. 5, a region where the eight prediction angles (numbered 0-7 in FIG. 5) are located may be divided into four regions including a first division region 510, a second division region 520, a third division region 530 and a fourth division region 540. For current blocks corresponding to prediction angles in different division regions, equations for deriving the weight matrix of the luma blocks in the current blocks may be different.

For example, the weight matrix of a luma block may include sample weights of pixels in the luma block. The sample weights of pixels in the luma block may be determined based on reference weights of the pixels at prediction positions. The prediction positions may be associated with reference weight parameters in the AWP technique and valid lengths of the reference weights. As a further example, the weight matrix of a luma block corresponding to prediction angle θ or prediction angle 1 in the first division region 510 may be determined according to Equations (1)-(4) as follows. A valid length of reference weights of the luma block may be determined according to Equation (1) as follows:

$$\text{ValidLength}=(N+(M>>X))<<1, \qquad (1)$$

where ValidLength denotes a valid length of reference weights of the luma block, N denotes a height of the luma block, M denotes a width of the luma block, and X denotes an absolute value of a logarithm of the prediction angle to the base 2 (e.g., |log$_2$ prediction angle 0|, |log$_2$ prediction angle 1|). The reference weight parameter in the AWP technique may be denoted as Equation (2) as follows:

$$\text{FirstPos}=(\text{ValidLength}>>1)-6+Y*((\text{ValidLength}-1)>>3), \qquad (2)$$

where FirstPos denotes the reference weight parameter in the AWP technique, and Y denotes a prediction position of a reference weight. The reference weight of a prediction position may be determined according to Equation (3) as follows:

$$\text{ReferenceWeights}[x]=\text{Clip3}(0,8,x-\text{FirstPos}), \qquad (3)$$

where ReferenceWeights [x] denotes a reference weight at a prediction position x, x ∈ [0, ValidLength−1]. A weight of each pixel [x] [y] in the luma block may be denoted or determined according to Equation (4) as follows:

$$\text{SampleWeight}[x][y]=\text{ReferenceWeights}[(y<<1)+(x<<1)>X)], \qquad (4)$$

where SampleWeight [x] [y] denotes the weight of each pixel [x] [y] in the luma block.

As another example, the weight matrix of a luma block corresponding to prediction angle 2 or prediction angle 3 in the second division region 520 may be determined according to Equations (5)-(8) including:

$$\text{ValidLength}=(N+(M>>X))<<1, \qquad (5)$$

$$\text{FirstPos}=(\text{ValidLength}>>1)-4+Y*((\text{ValidLength}-1)>>3)-((M<<1)>>X), \qquad (6)$$

$$\text{ReferenceWeights}[x]=\text{Clip3}(0,8,x-\text{FirstPos}), \qquad (7)$$

$$\text{SampleWeight}[x][y]=\text{ReferenceWeights}[(y<<1)-((x<<1)>>X)]. \qquad (8)$$

As a further example, the weight matrix of a luma block corresponding to prediction angle 4 or prediction angle 5 in the third division region 530 may be determined according to Equations (9)-(12) including:

$$\text{ValidLength}=(M+(N>>X))<<1, \qquad (9)$$

$$\text{FirstPos}=(\text{ValidLength}>>1)-4+Y*((\text{ValidLength}-1)>>3)-((N<<1)>>X), \qquad (10)$$

$$\text{ReferenceWeights}[x]=\text{Clip3}(0,8,x-\text{FirstPos}), \qquad (11)$$

$$\text{SampleWeight}[x][y]=\text{ReferenceWeights}[(x<<1)-((y<<1)>>X)]. \qquad (12)$$

As a further example, the weight matrix of a luma block corresponding to prediction angle 6 or prediction angle 7 in the fourth division region 540 may be determined according to Equations (14)-(16) including:

$$\text{ValidLength}=(M+(N>>X))<<1, \qquad (13)$$

$$\text{FirstPos}=(\text{ValidLength}>>1)-6+Y*((\text{ValidLength}-1)>>3), \qquad (14)$$

$$\text{ReferenceWeights}[x]=\text{Clip3}(0,8,x-\text{FirstPos}), \qquad (15)$$

$$\text{SampleWeight}[x][y]=\text{ReferenceWeights}[(x<<1)+((y<<1)>>X)]. \qquad (16)$$

In some embodiments, a weight matrix of a chroma block may be determined according to a weight at an upper left corner of a weight matrix of a corresponding 2×2 luma block. For example, the weight matrix of the chroma block may be determined according to Equation (17) as follows:

$$\text{SampleWeightChroma}[x][y]=\text{SampleWeight}[x>>1][y>>1], \qquad (17)$$

where SampleWeightChroma [x] [y] denotes a weight of each pixel [x] [y] in the chroma block, x is in a range from 0~ (M/2−1), y is in a range from 0~ (N/2−1), M is a width of the chroma block, and N is a height of the chroma block.

In some embodiments, when the weight matrix of the current AWP mode is determined, the current block may be divided based on the weight matrix. For example, a region of the weight matrix including weights larger than or equal to a threshold may be determined as sub-block 1, and a region of the weight matrix including weights less than the threshold may be determined as sub-block 2.

In some embodiments, the division mode used for obtaining the two sub-blocks may include a horizontal division, a vertical division, and a diagonal division. For example, each of the 56 AWP modes may correspond to a division angle. The horizontal division may correspond to a division angle of 90 degrees. The vertical division may correspond to a division angle of 180 degrees. The diagonal division may correspond to a division angle parallel to or coincident with a diagonal of the current block. In some embodiments, divisions in which the division angles are not 90 degrees or 180 degrees (e.g., the diagonal division) may be referred to as an inclined division. At least one of the two sub-blocks obtained in the inclined division may have an irregular shape.

In some embodiments, the inclined division of the current block may be converted into a rectangular division of the current block using the division mode. The rectangular division may include the horizontal division and/or the vertical division.

In some embodiments, the two sub-blocks may be obtained according to the inclined division, and the division mode including the rectangular division converted from the inclined division may be used in a motion compensation performed on each of the two sub-blocks, which may improve encoding efficiency.

For example, the processing device may obtain the two sub-blocks by dividing the current block according to the inclined division. Further, the processing device may convert the inclined division of the current block to the rectangular division of the current block. The two sub-blocks (i.e., two rectangular sub-blocks) corresponding to the rectangular division may be used in the motion compensation. In some embodiments, the processing device may perform a conversion between the inclined division and the rectangular division based on a count of pixels of at least one of the two sub-blocks obtained according to the inclined division. In some embodiments, the processing device may perform a conversion between the inclined division and the rectangular division based on a position of a dividing point between the two sub-blocks obtained according to the inclined division. For each of the two sub-blocks, an area of the sub-block before the conversion may be the same as or different from an area of the sub-block after the conversion. In some embodiments, the sub-block after the conversion may be a rectangular sub-block. In some embodiments, the area of the rectangular sub-block after conversion may be closest to an integral multiple of 4.

In some embodiments, to perform the conversion between the inclined division and the rectangular division, the processing device may determine a count of pixels in the sub-block having the triangular shape. Further, the processing device may determine a height or a width of the rectangular sub-block after the conversion based on the count of pixels and the division mode of the rectangular division (e.g., the horizontal division mode or the vertical division mode). Merely by way of example, the two sub-blocks before the conversion may include a triangular sub-block. The processing device may determine an area of the rectangular sub-block based on a width and a height of the triangular sub-block (e.g., through calculation or scale conversion). Then the processing device may determine a height of the rectangular sub-block after the conversion based on a width of the rectangular sub-block. In some embodiments, when the width of the triangular sub-block is greater than the height of the triangular sub-block, the processing device may designate the width of the triangular sub-block as the width of the rectangular sub-block after the conversion.

In some embodiment, the two sub-blocks may include two rectangular sub-blocks. For example, after determining the weight matrix of the current block in a current AWP mode, the processing device may obtain two rectangular sub-blocks (e.g., a first rectangular sub-block and a second rectangular sub-block) by dividing the current block based on the weight matrix. In some embodiments, the processing device may perform the motion compensation based on each rectangular sub-block of the current block, which may improve prediction efficiency of the current block.

The first rectangular sub-block may include as many pixels whose weights are less than a threshold as possible, or including all pixels whose weights are less than the threshold. A width and a height of the first rectangular sub-block may be a multiple of 4 (i.e., a smallest unit in block processing), which may facilitate the motion compensation performed on the first rectangular sub-block. In some embodiments, the second rectangular sub-block may include as few pixels whose weights are less than the threshold as possible, or the second rectangular sub-block may not include pixels whose weights are less than the threshold. A width and a height of the second rectangular sub-block may also be a multiple of 4.

In some embodiments, to determine the first rectangular sub-block and the second rectangular sub-block of the current block based on the weight matrix, a region in which the weights are less than the threshold in the current block may be determined based on the weight matrix. Further, a ratio of a count of pixels in the region to a total count of pixels in the current block may be determined. If the division mode used for obtaining the first rectangular sub-block and the second rectangular sub-block is the horizontal division, a first product of the ratio and height of the current block may be determined. Further, a height of the first rectangular sub-block may be determined by modifying the first product to an integer multiple of 4. If the division mode used for obtaining the first rectangular sub-block and the second rectangular sub-block is the vertical division, a second product of the ratio and the width of the current block may be determined. Further, the width of the first rectangular sub-block may be determined by rounding and modifying the second product to an integer multiple of 4. In such cases, the inclined division may be converted into the rectangular division.

Figure 6:
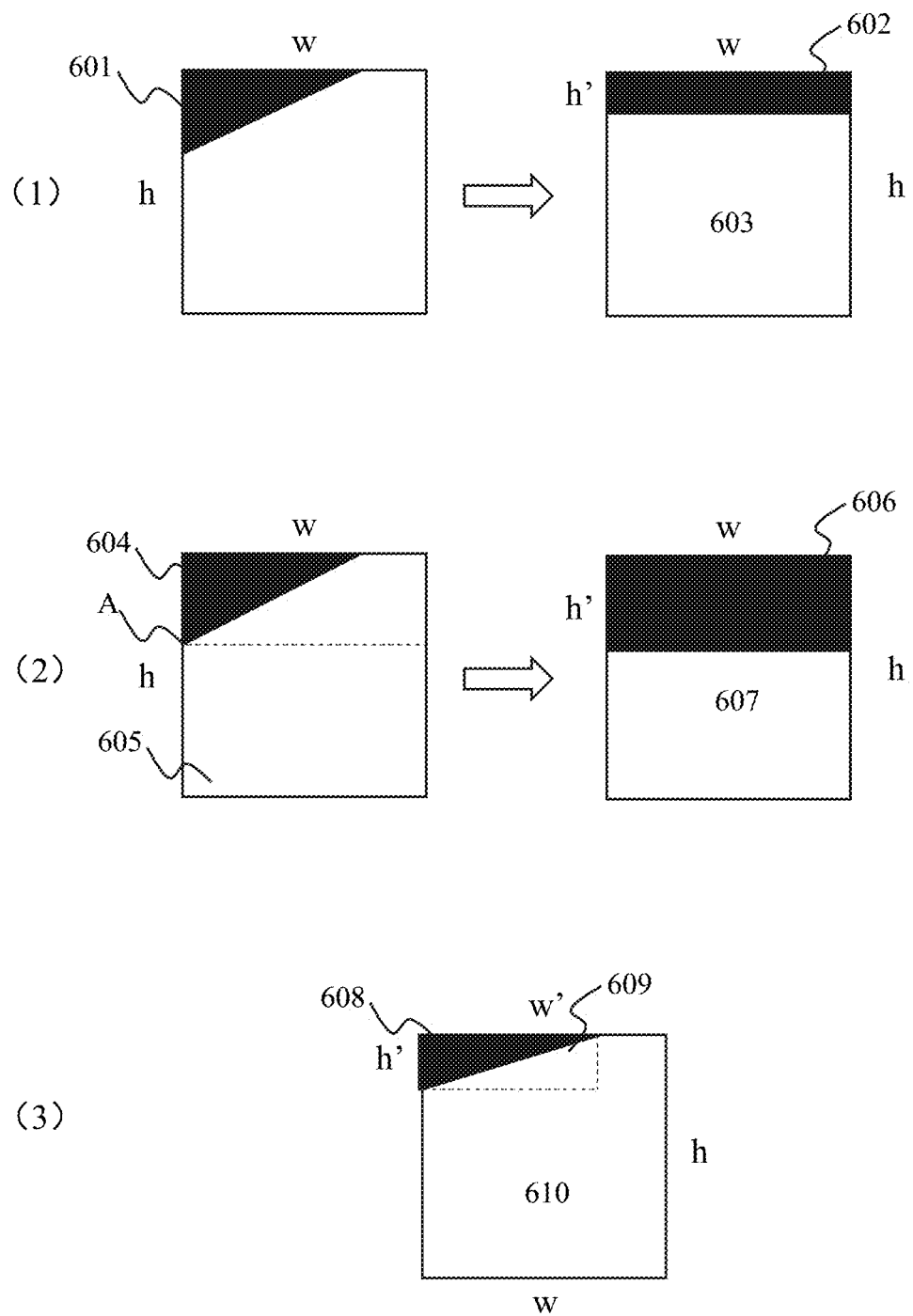
FIG. 6 is a schematic diagram illustrating exemplary processes for converting an inclined division into a rectangular division according to some embodiments of the present disclosure.

For example, FIG. 6 is a schematic diagram illustrating exemplary processes for converting an inclined division into a rectangular division according to some embodiments of the present disclosure. As shown in (1) of FIG. 6, for a current block having a size of 64*64, a ratio (count$_1$/count=0.11) of a count of pixels count$_1$ in a region 601 including weights less than a threshold to a total count of pixels count in a weight matrix of a current AWP mode may be determined. Further, a first product (i.e., h'=h×count/count$_1$) of the ratio and a height h count of the current block may be determined. h' (7.04) may be rounded and modified to an integer multiple of 4 (i.e., 8). A height of the first rectangular sub-block 602 may be determined as 8. A width of the first rectangular sub-block 602 may be the same as a width w of the current block. Correspondingly, a height of the second rectangular sub-block 603 may be 56 and a width of the second rectangular sub-block 603 may be 64.

In some embodiments, to determine the first rectangular sub-block and the second rectangular sub-block of the current block based on the weight matrix, a region in which the weights are less than the threshold in the current block may be determined based on the weight matrix. If the division mode used for obtaining the first rectangular sub-block and the second rectangular sub-block is the horizontal division, a height $h_1$ of the first rectangular sub-block may be determined by rounding and modifying the height of the region to an integer multiple of 4. The first rectangular sub-block with the height $h_1$ may include all pixels whose weights are less than the threshold. Correspondingly, a height $h_2$ of the second rectangular sub-block may be a difference between the height of the current block and the height $h_1$ of the first rectangular sub-block, and the width of the first rectangular sub-block and the width of the second rectangular sub-block may be equal to the width of the current block. If the division mode used for obtaining the first rectangular sub-block and the second rectangular sub-block is the vertical division, the width of the first rectangular sub-block may be determined by rounding and modifying the width of the region to an integer multiple of 4. The first rectangular sub-block with the height may include all pixels whose weights are less than the threshold. Correspondingly, the width of the second rectangular sub-block may be a difference between the width of the current block and the width of the first rectangular sub-block, and the height of the first rectangular sub-block and the height of the second rectangular sub-block may be equal to the height of the current block. In such cases, the inclined division may be converted into the rectangular division. The pixels in the current block whose weights are less than the threshold may be located in the first rectangular sub-block, and the weight of the pixels in the second rectangular sub-block may be greater than the threshold.

For example, as shown in (2) of FIG. 6, a division mode for obtaining a first rectangular sub-block 606 and a second rectangular sub-block 607 based on the AWP mode may be a horizontal division. A position of a dividing point A of a region 604 where the weights are less than the threshold and the region 605 where the weights are larger than the threshold may be obtained based on the weight matrix. Further, the height h' of the first rectangular sub-block 606 may be determined based on the position of the dividing point A. For example, a value of the position of the dividing point A may be rounded to an integer multiple of 4. Then the rounded value may be designated as the height h' of the first rectangular sub-block. In some embodiments, the height of the first rectangular sub-block 606 corresponding to the vertical division may be determined based on a similar manner as that corresponding to the horizontal division.

In some embodiments, to determine the first rectangular sub-block and the second rectangular sub-block of the current block based on the weight matrix, a minimum rectangle including the region where the weights are less than the threshold in the weight matrix of the current block may be designated as the first rectangular sub-block, and a minimum rectangle including the region where the weights are larger than the threshold may be designated as the second rectangular sub-block. In such cases, the inclined division mode may be retained, which may improve the efficiency of the AWP technique.

For example, as shown in (3) of FIG. 6, a width of a region 608 in which the weights are less than the threshold may be rounded to an integer multiple of 4, which may be designated as a width w' of a first rectangular sub-block 609. A height of the region 608 may be rounded to an integer multiple of 4 as a height h' of the first rectangular sub-block 609. A width of a region in which the weights are larger than the threshold may be rounded to an integer multiple of 4, which may be designated as a width w of a second rectangular sub-block 610, and a height of the region where the weights are larger than the threshold may be rounded to an integer multiple of 4, which may be designated as a height h of the second rectangular sub-block 610.

In some embodiments, the two sub-blocks may be obtained by dividing the current block according to the rectangular division converted from the inclined division. For example, the processing device may obtain two intermediate sub-blocks by dividing the current block according to the inclined division. Further, the processing device may obtain the two sub-blocks by converting the inclined division of the current block into the rectangular division of the current block. In some embodiments, the processing device may convert the inclined division of the current block into the rectangular division of the current block based on a count of pixels of at least one of the two intermediate sub-blocks. For example, the processing device may convert, according to operations similar to the conversion used in the motion compensation, the inclined division of the current block into the rectangular division of the current block based on the count of pixels of at least one of the two intermediate sub-blocks. In some embodiments, the processing device may convert the inclined division of the current block into the rectangular division of the current block based on a position of a dividing point between the two intermediate sub-blocks. For example, the processing device may convert, according to operations similar to the conversion used in the motion compensation, the inclined division of the current block into the rectangular division of the current block based on the position of a dividing point between the two intermediate sub-blocks.

According to the conversion between the inclined division and the rectangular division, a sub-block having an irregular shape may be converted into a sub-block having a regular shape. In such cases, a motion compensation may be performed on sub-blocks having regular shapes of the current block, which may improve the prediction efficiency of the current block. In addition, when the first rectangular sub-blocks and the second rectangular sub-blocks corresponding to different AWP modes are the same, the motion compensation and a cost calculation may be performed on only one AWP mode of the different AWP modes, which may reduce computational complexity and improve encoding efficiency.

In some embodiments, the valid length of the reference weights in the division mode may be modified. Then the division mode (e.g., the horizontal AWP modes and the vertical AWP modes of the 56 AWP modes) may be expanded or cropped based on the modified valid length to form an expanded division mode or a cropped division mode. The expanded division mode may refer to that a count of the division modes may be increased, and the cropped division mode may refer to that the count of the division modes may be reduced. In some embodiments, the division mode may be expanded or cropped by modifying a starting point or a step size of the division mode. For example, the starting point or the step size may be modified by modifying the equation for determining FirstPos. For example, the equation for determining FirstPos in the AWP technique may be modified as Equation (18) as follows:

$$FirstPos=(ValidLength>>1)-4+Y*(ValidLength>>4), \qquad (18)$$

in such cases, the 7 horizontal AWP modes and the 7 vertical AWP modes may be expanded to 15 horizontal AWP modes and 15 vertical AWP modes, respectively. Then 30 AWP modes may be obtained based on the equation (18) for determining FirstPos, which may improve the accuracy of a division and a prediction. As another example, the equation for determining FirstPos in the AWP technique may be modified as Equation (19) as follows:

$$FirstPos=(ValidLength>>1)-4+Y*(ValidLength>>2), \qquad (19)$$

in such cases, the 7 horizontal AWP modes and the 7 vertical AWP modes may be cropped into 3 horizontal AWP modes and 3 vertical AWP modes, respectively. Then 6 AWP modes may be obtained based on the equation (19) for determining FirstPos, which may reduce the complexity of calculation. As a further example, the equation for determining FirstPos in the AWP technique may be modified as Equation (20) as follows:

$$FirstPos=(ValidLength>>1)-12+Y*(ValidLength>>2), \qquad (20)$$

in such cases, the starting point may be modified based on the 6 AWP modes.

According to some embodiments, the division mode may be expanded by modifying the valid length, which may provide more division modes for improving a compression ratio. The division mode may also be cropped by modifying the valid length, which may reduce the computational complexity and improve the computational efficiency.

In 330, the processing device 1310 (e.g., a prediction result determination module 1430 illustrated in FIG. 14) may determine, based on the two sub-blocks, a prediction result of the current block.

In some embodiments, to determine, based on the two sub-blocks, the prediction result of the current block, the processing device may obtain motion compensation information of the two sub-blocks by performing, based on the rectangular division, a motion compensation on the two sub-blocks. Further, the processing device may determine, based on the motion compensation information and the inclined division, target prediction values of the two sub-blocks. Further, the processing device may determine, based on the target prediction values of the two sub-blocks, the prediction result of the current block.

The motion compensation refers to an operation in which motion information in a motion information candidate list may be traversed, and a prediction value of a block (e.g., the current block, the sub-block) may be obtained based on a pixel interpolation and the motion information. Then a distortion cost (also referred to as cost) of a prediction value corresponding to each motion information may be determined. A prediction value corresponding to the lowest distortion cost may be determined as a target prediction value of the block.

In some embodiments, to obtain the motion compensation information of the two sub-blocks, the processing device may obtain first motion information and second motion information from a motion information candidate list. Further, the processing device may obtain the prediction value of the first rectangular sub-block and the prediction value of the second rectangular sub-block by performing a motion compensation on the first rectangular sub-block and the second rectangular sub-block, respectively. The motion compensation information of the two sub-blocks may include the prediction value of the first rectangular sub-block and the prediction value of the second rectangular sub-block.

In some embodiments, the prediction value of the first rectangular sub-block may be used as a target prediction value of the first rectangular sub-block determined based on the first motion information in the current AWP mode, and the prediction value of the second rectangular sub-block may be used as a target prediction value of the second rectangular sub-block determined based on the second motion information in the current AWP mode. For example, if the two sub-blocks are obtained by dividing the current block according to the rectangular division, the target prediction value of the first rectangular sub-block and the target prediction value of the second rectangular sub-block may be determined as the target prediction values of the two sub-blocks. Further, the prediction result of the current block in the current AWP mode corresponding to a combination of the motion information (the first motion information—the second motion information) may be obtained.

In some embodiments, the first rectangular sub-block including the prediction value and the second rectangular sub-block including the prediction values may be determined as predicted sub-blocks corresponding to the two sub-blocks. To obtain the prediction result of the current block, the processing device may further obtain filtered pixel values by performing a first filtering operation on pixel values at a junction region of the two predicted sub-blocks, and designate the filtered pixel values as target prediction values of the two predicted sub-blocks. Further, the processing device may determine, based on the target prediction values of the two sub-blocks, the prediction result of the current block.

In some embodiments, the target prediction values of pixels at a junction region of the first rectangular sub-block and the second rectangular sub-block may be obtained by performing a first filtering operation on the pixels at the junction of the first rectangular sub-block and the second rectangular sub-block based on the prediction value of the first rectangular sub-block and the prediction value of the second rectangular sub-block. In some embodiments, the first filtering operation may include a boundary filtering operation. As used herein, the boundary filtering operation refers to an operation for modifying pixel values at the junction of the first rectangular sub-block and the second rectangular sub-block. A pixel at a junction region of the first rectangular sub-block and the second rectangular sub-block refers to a pixel in the first rectangular sub-block or the second rectangular sub-block near a junction of the first rectangular sub-block and the second rectangular sub-block.

In some embodiments, the filtered pixel values may be obtained by performing the first filtering operation (e.g., the boundary filtering operation) on pixel values at a junction of the two predicted sub-blocks. For example, the filtered pixel values may be obtained by performing the first filtering operation on a row of pixels at a boundary of a first sub-block and two rows of pixels at a boundary of a second sub-block. The filtered pixel values may be updated as the target prediction values of the two sub-blocks. Further, the prediction result of the current block may be determined based on the target prediction values of the two sub-blocks. For example, the prediction result of the current block may include the target prediction values of the two sub-blocks. In such cases, the prediction result of the current block may be obtained based on the first filtering operation directly without performing a weighting operation on the current block based on two sets of prediction values and two weight matrixes of the two sub-blocks, which may reduce the computational complexity and make a transition of pixel values at boundaries of the two sub-blocks more smooth.

Figure 7A:
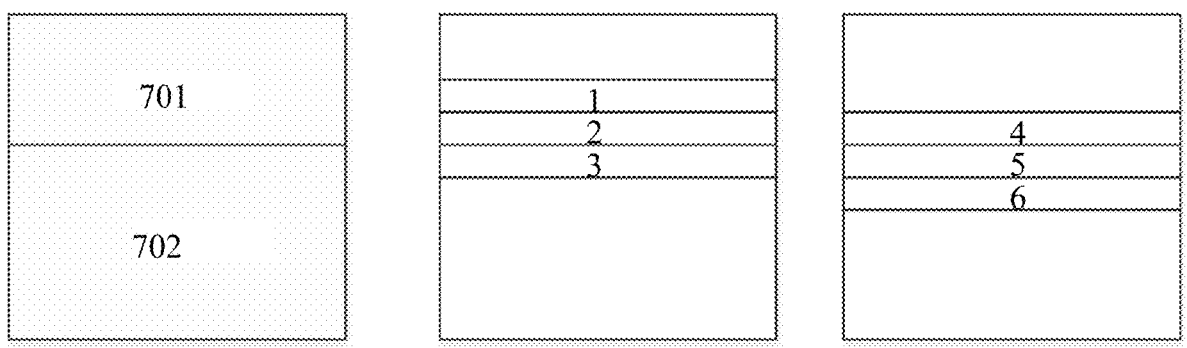
FIG. 7A is a schematic diagram illustrating an exemplary filtering operation according to some embodiments of the present disclosure.
Figure 7B:
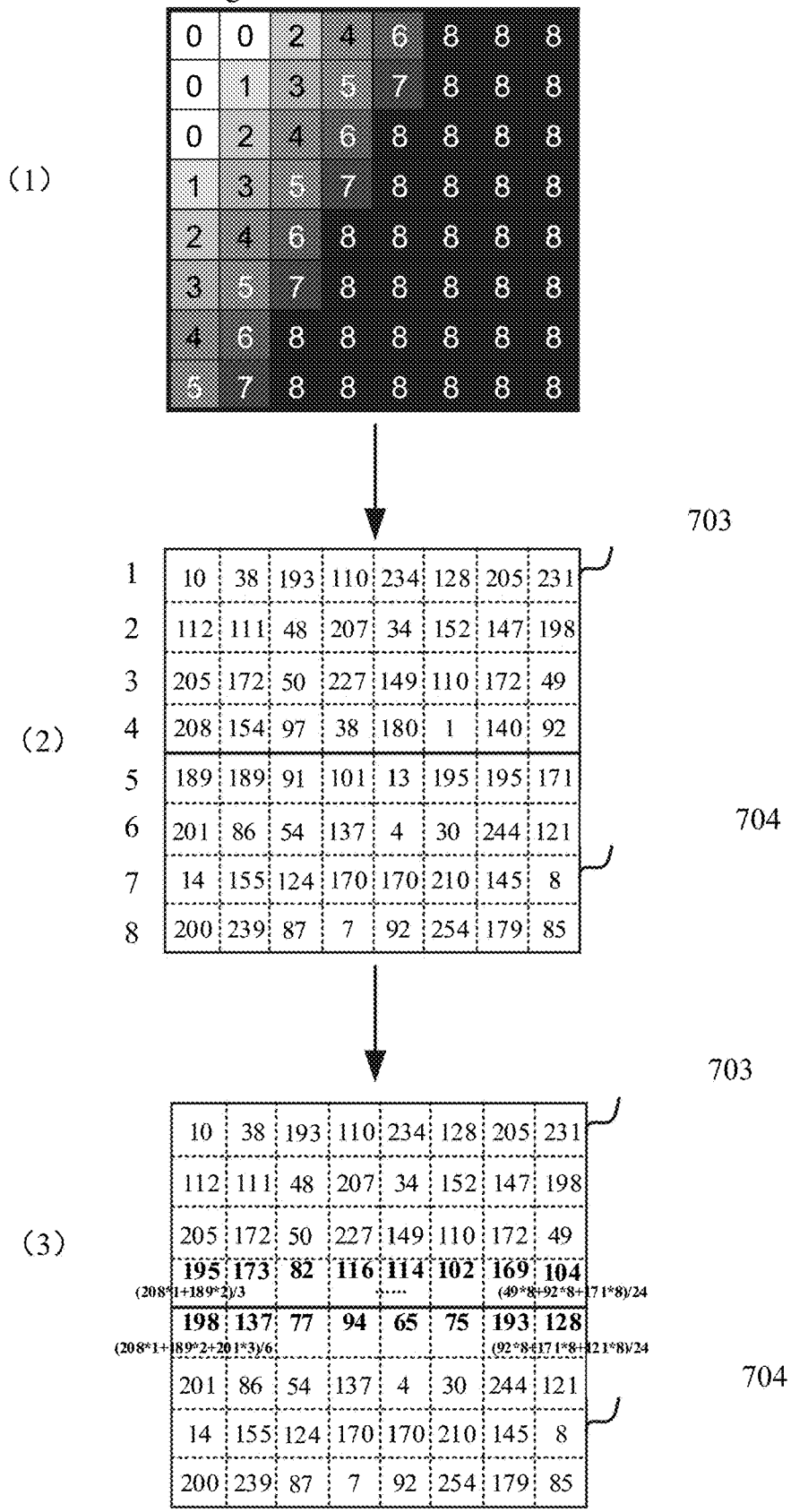
FIG. 7B is a schematic diagram illustrating another exemplary filtering operation according to some embodiments of the present disclosure.

In some embodiments, the filtering operation may be performed based on a tap filter. The tap filter may include a three-tap filter or a five-tap filter. For example, FIG. 7A is a schematic diagram illustrating an exemplary filtering operation according to some embodiments of the present disclosure. As shown in FIG. 7A, target prediction values of a first rectangular sub-block 701 and a second rectangular sub-block 702 may be obtained by performing the boundary filtering operation on pixel values at the same boundary of a first rectangular sub-block 701 and a second rectangular sub-block 702. Coefficients of a tap filter used in the boundary filtering operation may include {1, 2, 1}. For example, pixel values of a last row (row 2 shown in FIG. 7A) of the first rectangular sub-block 701 may be filtered based on pixel values of last two rows (row 1 and row 2 in FIG. 7A) of the first rectangular sub-block 701 and pixel values of a first row (row 3 in FIG. 7A) of the second rectangular sub-block 702. As another example, pixel values of a first row (row 5 in FIG. 7A) of the second rectangular sub-block 702 may be filtered based on pixel values of a last row (row 4 in FIG. 7A) of the first rectangular sub-block 701 and pixel values of first two rows (row 5 and row 6 in FIG. 7A) of the second rectangular sub-block 702. In some embodiment, pixel values at the same boundary of the first rectangular sub-block and the second rectangular sub-block may be filtered based on the weights and prediction values of pixels at the boundary of the first rectangular sub-block and the second rectangular sub-block. For example, FIG. 7B is a schematic diagram illustrating another exemplary filtering operation according to some embodiments of the present disclosure. As shown in FIG. 7B, a weight matrix of the current block is shown in (1) of FIG. 7B, and a threshold corresponding to the weight matrix may be 1. As shown in (2) of FIG. 7B, the current block may be divided into a first rectangular sub-block 703 (row 1-row 4 in FIG. 7B) and a second rectangular sub-block 704 (row 5-row 8 in FIG. 7B). After the prediction values of the first rectangular sub-block 703 and the second rectangular sub-block 704 are obtained, the pixel values of a last row (row 4 in FIG. 7B) of the first rectangular sub-block 703 may be filtered based on the pixel values of last two rows (row 3 and row 4 in FIG. 7B) of the first rectangular sub-block 703 and the pixel values of a first row (row 5 in FIG. 7B) of the second rectangular sub-block 704. Further, as shown in (3) of FIG. 7B, target prediction values of the pixels at the boundary of the first rectangular sub-block 703 and the second rectangular sub-block 704 may be obtained by using a weight at a corresponding position in the weight matrix as a weighting coefficient of the prediction value of each pixel.

In some embodiments, to obtain the two predicted sub-blocks corresponding to the two sub-blocks, the processing device may obtain motion compensation information of the two sub-blocks by performing, based on the rectangular division, a motion compensation on the two sub-blocks. For example, the processing device may obtain the motion compensation information by performing the motion compensation on the first rectangular sub-block and the second rectangular sub-block. The motion compensation information of the two sub-blocks may include prediction values of the first rectangular sub-block and the second rectangular sub-block. Further, the processing device may determine, based on the motion compensation information and the inclined division, target prediction values of the two sub-blocks. Further, the processing device may obtain two updated sub-blocks corresponding to the two sub-blocks by performing, based on the target prediction values of the two sub-blocks, a second filter operation on the two sub-blocks. Then the processing device may designate the two updated sub-blocks as the two predicted sub-blocks. In some embodiments, the processing device may obtain the prediction result of the current block based on the two predicted sub-blocks. For example, the prediction result may include information of the two predicted sub-blocks.

According to some embodiments of the present disclosure, the prediction result of the current block may be obtained based on the filtering operation directly without performing a weighting operation on the current block based on two sets of prediction values and two weight matrixes of the two sub-blocks, which may reduce the computational complexity and make a transition of pixel values at boundaries of the two sub-blocks more smooth. In some embodiments, the filtering operation may be performed on sub-blocks in a B frame or a P frame.

In some embodiments, if the two sub-blocks are obtained according to the inclined division. The motion compensation information of the two sub-blocks may be obtained by performing the motion compensation on the two rectangular sub-blocks. Further, the target prediction values of the two sub-blocks may be obtained from the motion compensation information (i.e., the prediction values of the first rectangular sub-block and the second rectangular sub-block).

For example, when the first rectangular sub-block is the smallest rectangle including a region in which the weights are less than the threshold, and the second rectangular sub-block is the smallest rectangle including a region in which the weights are larger than the threshold, a target prediction value of the region in which the weights are less than the threshold may be determined from the prediction value at a corresponding position of the first rectangular sub-block and a target prediction value of the region in which the weights are larger than the threshold may be determined from the predicted value of a corresponding position of the second rectangular sub-block. In such cases, a prediction value of the current block in the current AWP mode in a combination of the motion information (the first motion information—the second motion information) may be obtained, which may improve accuracy and/or efficiency of the AWP technique. For example, as shown in (3) of FIG. 6, the prediction value of the corresponding position (a filled region (i.e., the region 608) in (3) of FIG. 6 of the first rectangular sub-block 609 may be determined as the target prediction value of the region in which the weights are less than the threshold. And the prediction value of the corresponding position region (an unfilled region in (3) of FIG. 4) in the second rectangular sub-block 610 may be determined as the target prediction value of the region in which the weights are larger than the threshold.

In some embodiments, the motion information candidate list may include basic motion information such as motion information in time domain, motion information in spatial domain, or history-based motion vector prediction (HMVP), etc., and extended motion information. In some embodiments, the motion information of the first rectangular sub-block and/or the second rectangular sub-block may be used as the extended motion information. The extended motion information may be obtained by performing an offset operation on the basic motion information based on an offset distance and an offset direction. In such cases, an ultimate motion vector expression (UMVE) may be used in the inter prediction of the present disclosure for adjusting the motion information used in a prediction of the sub-block. Then more accurate motion information may be obtained, which may improve the accuracy of the prediction result of the current block.

In some embodiments, four offset directions as shown in Table 1 and five offset distances as shown in Table 2 may be used in the UMVE. That is, one kind of motion information may correspond to 20 offset results. As used herein, the offset direction may refer to a direction in which a position of a block (e.g., the current block, the sub-block) moves relatively to a previous frame in space. For example, motion information may be selected from the motion information candidate list and an offset operation in corresponding directions may be performed based on the motion information. The offset distance may refer to how many times of y pixel accuracy of the current block changes relatively to a corresponding position of the previous frame in space. For example, 2-pel in Table 1 indicates that the offset distance is 2 times of pixel accuracy.

TABLE 1

| Distance IDX | 0 | 1 | 2 | 3 | 4 |
|---|---|---|---|---|---|
| Pixel distance | 1/4-pel | 1/2-pel | 1-pel | 2-pel | 4-pel |

TABLE 2

| Direction IDX | 00 | 01 | 10 | 11 |
|---|---|---|---|---|
| x-axis | +(Right) | −(Left) | N/A | N/A |
| y-axis | N/A | N/A | +(Down) | −(Up) |

In some embodiment, the offset directions may include four directions: up, down, left, right. In some embodiment, the offset directions may also include diagonal offset directions. For example, as shown in Table 3, the offset directions may include eight directions: up, down, left, right, upper left, upper right, lower left and lower right. As used herein, the up and down directions may coincide with a straight line passing through a center of the current block and parallel to the upper side or the bottom side of the current block. The left and right directions may coincide with a straight line passing through the center of the current block and parallel to the left side or the right side of the current block. And the upper left, upper right, lower left and lower right directions may coincide with the diagonals of the current block. In such cases, the offset directions used for adjusting the motion information in the prediction of the sub-blocks may be increased, and more accurate motion information may be obtained, which may improve the accuracy of the prediction result of the current block. In some embodiments, the offset directions may also include a direction with a slope of 2.

TABLE 3

| Direction IDX | 000 | 001 | 010 | 011 | 100 | 101 | 110 | 111 |
|---|---|---|---|---|---|---|---|---|
| x-axis | +(Right) | −(Left) | N/A | N/A | +(Right) | −(Left) | −(Left) | +(Right) |
| y-axis | N/A | N/A | +(Down) | −(Up) | +(Down) | −(Up) | +(Down) | −(Up) |

In some embodiments, the offset distances may include 1/16 pixel accuracy, 8 times of pixel accuracy, 16 times of pixel accuracy, or the like. In some embodiments, as shown in Table 4, the offset distance may include 1/16 pixel accuracy, 1/4 pixel accuracy, 1/2 pixel accuracy, 1 pixel accuracy, 2 times of pixel accuracy, 4 times of pixel accuracy, 8 times of pixel accuracy, 16 times of pixel accuracy and 32 times of pixel accuracy.

TABLE 4

| Distance IDX | 0 | 1 | 2 | 3 | 4 | 5 | 6 | 7 |
|---|---|---|---|---|---|---|---|---|
| Pixel distance | 1/4-pel | 1/2-pel | 1-pel | 2-pel | 4-pel | 8-pel | 16-pel | 32-pel |

In some embodiments, the offset direction and offset distance may be modified simultaneously or one of the offset direction and offset distance may be modified. For example, the offset distance may be remained, and the offset direction may be arbitrarily selected from the offset directions in Table 3. As another example, the offset direction may be remained, and the offset distance may be arbitrarily selected from the offset distances in Table 4. As a further example, the offset direction shown in Table 3 and the offset distance shown in Table 4 may be used at the same time and combined arbitrarily.

According to some embodiments of the present disclosure, the more searching directions may be provided in the inter prediction by adding the offset directions. In such cases, the accuracy of the prediction result and a compression ratio of the current block may be improved. More pixel accuracies may be provided by adding the offset distances. so that the motion of the current block may be more meticulous and accurate. In such cases, the precision and the accuracy of the prediction result, and compression ratio of the current block may be improved.

It should be noted that the above description of the process 300 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 8:
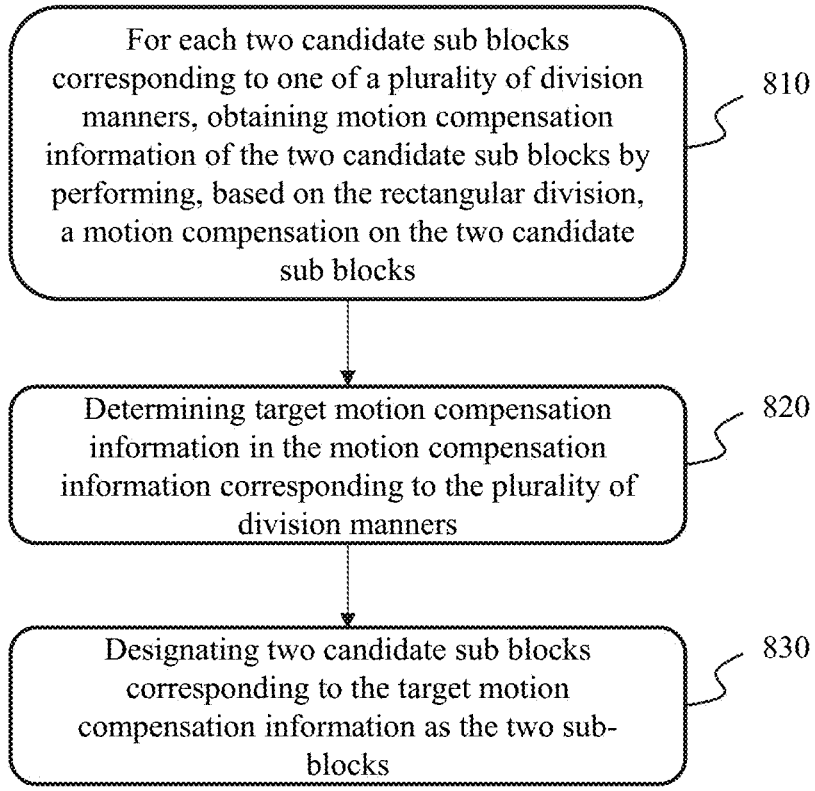
FIG. 8 is a flowchart illustrating an exemplary process for obtaining two sub-blocks according to some embodiments of the present disclosure.

FIG. 8 is a flowchart illustrating an exemplary process for obtaining two sub-blocks according to some embodiments of the present disclosure. In some embodiments, the process 800 may be implemented by a frame prediction system (e.g., the frame prediction system 100). In some embodiments, the frame prediction system may be implemented by software and/or hardware, and/or may be integrated in a frame prediction device (e.g., the frame prediction device 1300 shown in FIG. 13) that includes a processing device (e.g., the processing device 1310). In some embodiments, at least part of process 800 may be performed by the processing device including at least one processor and a storage device. For example, the process 800 may be stored in a storage device in the form of instructions (e.g., an application), and invoked and/or executed by the processing device (e.g., one or more modules or units illustrated in FIG. 14). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, at least part of the operation 320 in process 300 may be implemented according to the process 800.

In some embodiments, the current block may be divided into two sub-blocks according to a division mode. The division mode may include one of a plurality of division manners (e.g., the 56 AWP modes illustrated in FIG. 3).

In 810, for each of the plurality of division manners corresponding to two candidate sub-blocks, the processing device 1310 (e.g., the obtaining module 1420) may obtain motion compensation information of the two candidate sub-blocks by performing a motion compensation on the two candidate sub-blocks.

In some embodiments, the division mode may include one of an explicit division and an implicit division. In some embodiments, the explicit division and/or the implicit division may include a plurality of division manners.

In some embodiments, the explicit division may be performed based on division parameters. In some embodiments, the division parameters may be predetermined and stored in a storage device (e.g., a storage device of the frame prediction system 100 or an external storage device). The processing device may obtain the division parameters from the storage device. In some embodiments, the division parameters may include a step size. The step size may relate to division differences between the plurality of division manners. In some embodiments, the step size may be arranged in a horizontal direction or a vertical direction. In some embodiments, a plurality of space sizes may be used in the explicit division.

In some embodiments, the plurality of space sizes may be different. For example, the plurality of space sizes may be a distance of 2 blocks (e.g., a side length of two blocks), a distance of 3 blocks, or the like. In some embodiments, the space sizes may be determined according to step 0~step M. Step 0~step M may be set as different values. A count of division manners may change with a size of the current block. For example, if a size of the current block is 16×16, step 0 may be set as 2 and step 1 may be set as 4 in the horizontal direction, then there may be three division manners for dividing the current block. If step 2 is set as 8 in the vertical direction, there may be one division manner.

In some embodiments, the plurality of space sizes may be the same. For example, the plurality of space values may be a distance of 2 blocks. In some embodiments, if the values of step 0~step M are set as the same value, the division manners for dividing current blocks in different sizes may be different. For example, for a current block with a size of 8×8, when a step is set as 4, there may be two division manners including one division manner in the horizontal direction and one division manner in the vertical direction for dividing the current block. As another example, a current block with a size of 8×16 may have four division manners with three division manners in the horizontal direction and one division manner in the vertical direction.

The implicit division mode may be performed according to equations (also referred to as a derivation equation). In some embodiments, the implicit division may include equations for dividing the current block in at least one of a diagonal direction, a horizontal direction and/or a vertical direction.

For example, a first weight matrix corresponding to the division in the horizontal direction may be determined according to Equation (21) as follows:

$$\text{ValidLen}=N<<1, \quad (21)$$

where ValidLen denotes a valid length of reference weights, and N denotes a height of the current block. The reference weight parameter may be denoted as Equation (22) as follows:

$$\text{FirstPos}=(\text{ValidLen}>>1)-4+Y*(\text{ValidLen}>>3), \quad (22)$$

where FirstPos denotes the reference weight parameter, and Y denotes a prediction position of a reference weight, $Y\in[-3, 3]$. The reference weight of a prediction position may be determined according to Equation (23) as follows:

$$\text{ReferenceWeights}[x]=\text{Clip3}(0,8,x-\text{FirstPos}), \quad (23)$$

where $x\in[0, \text{ValidLength}-1]$. A weight of each pixel [x] [y] may be denoted or determined according to Equation (24) as follows:

$$\text{SampleWeight}[x][y]=\text{ReferenceWeights}[(y<<1)], \quad (24)$$

where SampleWeight [x] [y] denotes a weight of each pixel [x] [y] in the current block.

In some embodiments, a second weight matrix corresponding to the division in the vertical direction may be determined according to Equations (25)-(28) including:

$$\text{ValidLen}=M<<1, \quad (25)$$

$$\text{FirstPos}=(\text{ValidLen}>>1)-4+Y*(\text{ValidLen}>>3), \quad (26)$$

$$\text{ReferenceWeights}[x]=\text{Clip3}(0,8,x-\text{FirstPos}), \quad (27)$$

$$\text{SampleWeight}[x][y]=\text{ReferenceWeights}[(x<<1)], \quad (28)$$

where M denotes a width of the current block.

In some embodiments, the current block may be divided based on the weight matrix. In some embodiments, a region of the weight matrix including weights larger than or equal to a threshold T (e.g., T=4) may be determined as sub-block 1, and a region of the weight matrix including weights less than T may be determined as sub-block 2. For example, if the current block is divided in the horizontal direction, after obtaining a first weight matrix, a region of the current block corresponding to the region in the first weight matrix including weights less than a first threshold may be determined as a first rectangular sub-block. A region of the current block corresponding to a region in the first weight matrix including weights larger than or equal to the first threshold may be determined as a second rectangular sub-block. As another example, when the current block is divided in the vertical division, after obtaining a corresponding second weight matrix, a region of the current block corresponding to a region in the second weight matrix including weights less than a second threshold may be determined as the first rectangular sub-block. A region of the current block corresponding to a region in the second weight matrix including weights larger than or equal to the second threshold may be determined as the second rectangular sub-block.

In some embodiments, the division mode may be modified by modifying the equations for determining the weight matrix (e.g., Equations (21)-(28)). For example, parameters including a constant term, the prediction position Y, or a count of bits shifted right in the last term of Equation (22) may be modified to modify at least one of a starting point of the division, a count of division manners or the step size of division.

In some embodiments, the starting point of the division may be modified by adjusting the constant term in the Equations. For example, the Firstpos in the horizontal or vertical direction of the current block in large sizes (e.g., a width or a height of the current block is 32, 64, 128, etc.) may be modified to change the starting point. In such cases, a count of the division manners may be increased, which may be adapted to more image textures. For example, Equation (24) or (26) may be modified as Equation (29) as follows:

$$\text{FirstPos}=(\text{ValidLen}>>1)-6+Y*((\text{ValidLen}-1)>>3). \quad (29)$$

In some embodiments, the division manners may be extended by adjusting parameters. For example, the division manners may be increased by modifying the range of Y and the Equations (21)-(28). For example, equation (24) or (26) may be modified as Equation (30) as follows:

$$\text{FirstPos}=(\text{ValidLen}>>1)-6+Y*((\text{ValidLen}-1)>>4), \quad (30)$$

where when a range of Y is [−7, 7], a count of the division manners in the horizontal direction or a count of the vertical direction may be both expanded to 14.

In some embodiments, the division modes may be adjusted by modifying the step size. For example, Equation (24) or (26) may be modified Equation (31) as follows:

$$\text{FirstPos}=(\text{ValidLen}>>1)-6+Y*((\text{ValidLen}-1)/10), \quad (31)$$

where the value "10" indicates the step size, which may be modified to adjust the step size.

In some embodiments, the above modification manner may be combined to modify the division manners of the current block to adapt to more image textures. For example, the range of Y and parameters relating to the step size may be modified at the same time to adjust the count of division manners and the step size.

In some embodiments, each of the plurality of division manners may correspond two candidate sub-blocks. To obtain the motion compensation information of the two candidate sub-blocks, the processing device may perform a motion compensation on the two candidate sub-blocks. In some embodiments, the processing device may perform the motion compensation on the two candidate sub-blocks based on the rectangular division.

In some embodiments, to obtain the motion compensation information, a motion information candidate list may be determined. The motion information candidate list may include multiple candidate motion vectors. In some embodiments, the motion information candidate list may be determined based on a time domain block and an adjacent block. The time domain block may be a time domain block corresponding to the current block. The adjacent block may refer to one or more blocks at a position of an edge of the current block (e.g., a block E in FIG. 9) or a position of a vertex of the current block (e.g., blocks A, B, C, D, F and G in FIG. 9). The motion information candidate list may include motion information (e.g., motion vectors) in time domain, motion information in spatial domain, angular motion information, historical motion information (e.g., historical motion vectors), motion information expressed by advanced motion information, or the like, or any combination thereof. For example, the motion information candidate list of the current block may be determined by adding the motion information in time domain and the motion information in spatial domain of the current block into the motion information candidate list in a certain order. The certain order may be that the motion information in time domain is arranged before the motion information in spatial domain in the motion information candidate list, or the motion information in spatial domain is arranged before the motion information in time domain in the motion information candidate list. In some embodiments, to obtain the motion information in time domain, a reference frame in time domain of the current block may be determined. Further, a corresponding block of the current block on the reference frame in time domain may be determined based on the position of the current block. Further, the motion information in time domain of the current block may be obtained by scaling the motion information of the corresponding block according to a distance relationship between the corresponding block and the current block. In some embodiments, the motion information in time domain may be added to the motion information candidate list. In some embodiments, a preset count of motion information time domain may be added to the motion information candidate list. The preset count may be larger than or equal to 1. For example, the preset count may be 1, 2, 3, 5, or the like. It should be understood that the first preset count of motion information in time domain in the motion information candidate list may not be repetitive, that is, a reference frame index or motion information of any two sets of motion information time domain in the first preset count of motion information in time domain may be different.

Figure 9:
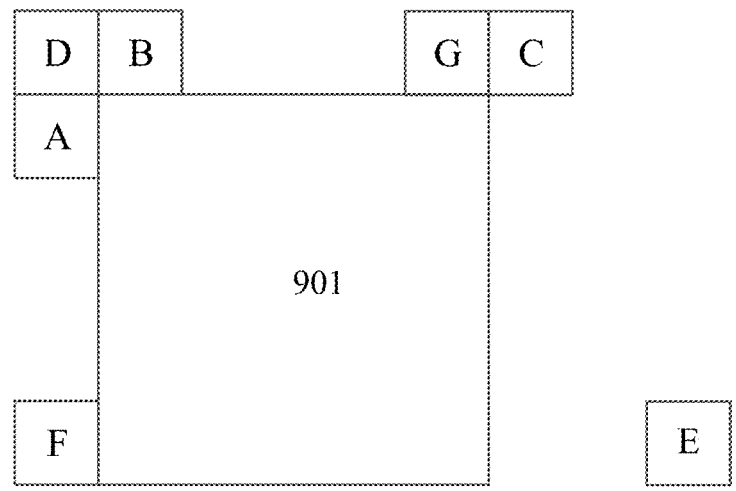
FIG. 9 is a schematic diagram illustrating exemplary adjacent blocks of a current block according to some embodiments of the present disclosure.

In some embodiments, the current block may correspond to one or more adjacent blocks. For example, FIG. 9 is a schematic diagram illustrating exemplary adjacent blocks of a current block according to some embodiments of the present disclosure. As shown in FIG. 9, a current block 901 may correspond to 7 adjacent blocks (A, B, C, D, E, F, and G). To determine the motion information candidate list based on the adjacent blocks, whether the adjacent blocks are available may be determined. In some embodiments, to determine whether an adjacent block is available, whether the adjacent block exists may be determined. In some embodiments, to determine whether the adjacent block exists, whether the inter prediction is used on the adjacent block may be determined.

For example, as shown in FIG. 9, to determine motion information in spatial domain of a current block 901, adjacent blocks of the current block 901 may be searched in an order of F, G, C, A, B, and D, and the motion information of adjacent blocks that is available and satisfies a certain condition may be added to the motion information candidate list. A condition for determining whether an adjacent block is available may include that the adjacent block is not encoded according to an intra prediction and the adjacent block has been encoded.

For example, an exemplary process for determining whether F, G, C, A, B, and D are available may include operations as follows. If F exists and is encoded according to an inter prediction, F may be "available", otherwise, F may be "not available"; if G exists and is encoded according to an inter prediction, G may be "available", otherwise, G may be "not available"; if C exists and is encoded according to an inter prediction, C may be "available", otherwise, C may be "not available"; if A exists and is encoded according to an inter prediction, A may be "available", otherwise, A may be "not available"; if B exists and is encoded according to an inter prediction, B may be "available", otherwise, B may be "not available"; if D exists and is encoded according to an inter prediction, D may be "available", otherwise, D may be "not available." In some embodiments, a count of the motion information in spatial domain in the motion information candidate list may not be limited. For example, the count of the motion information in spatial domain in the motion information candidate list may be 0, 1, 2, 3, or may be greater than or equal to 4.

Figure 10:
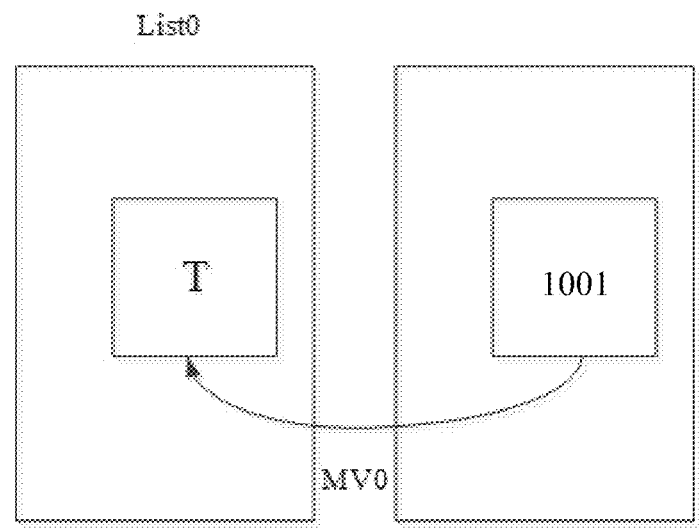
FIG. 10 is a schematic diagram illustrating an exemplary process for obtaining motion information in time domain according to some embodiments of the present disclosure.
Figure 11:
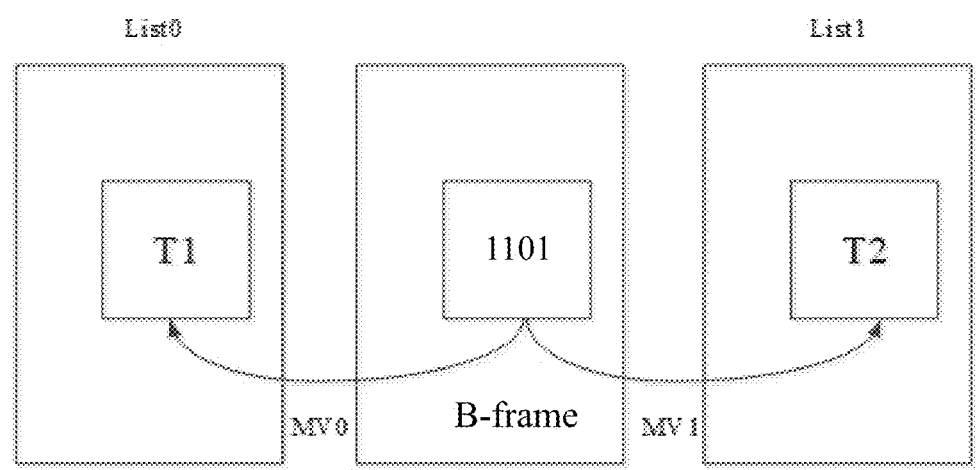
FIG. 11 is a schematic diagram illustrating another exemplary process for obtaining motion information in time domain according to some embodiments of the present disclosure.

In some embodiments, to determine the motion information candidate list, a type of the current frame may be determined. FIG. 10 is a schematic diagram illustrating an exemplary process for obtaining motion information in time domain according to some embodiments of the present disclosure. FIG. 11 is a schematic diagram illustrating another exemplary process for obtaining motion information in time domain according to some embodiments of the present disclosure. As shown in FIG. 10, if the type of the current frame is a P frame, motion information (e.g., an MV0) corresponding to a forward reference frame list list0 may be filled into the motion information candidate list until the motion information candidate list is full. As shown in FIG. 11, if the type of the current frame is a B frame and list0 and a backward reference frame list list1 exist, the MV0 and motion information (an MV1) corresponding to the backward reference frame list1 may be filled into the motion information candidate list. If the type of the current frame is a B frame and list0 exists, the MV0 may be filled into the motion information candidate list. If the type of the current frame is a B frame and list1 exists, the MV1 may be filled into the motion information candidate list. In some embodiments, the motion information candidate list may be obtained in an order of T, F, G, C, A, B, and D.

In some embodiments, if the motion information candidate list is not full, an MV (e.g., an MV in spatial domain or MV in time domain corresponding to a reference frame index closest to a picture order count (POC) of the current block) in the motion information candidate list may be scaled and filled behind the motion information candidate list until the motion information candidate list is full.

For example, as shown in FIG. 9, if the current frame is a bidirectional prediction encoding frame (e.g., the B frame), the motion information in spatial domain may be obtained in the order of F, G, C, A, B, and D, and if list0 and list1 exist, the MV0 and MV1 may be filled into the motion information candidate list. If list0 exists, the MV0 may be filled into the motion information candidate list. If list1 exists, the MV1 may be filled into the motion information candidate list. If the current frame is a unidirectional prediction encoding frame (e.g., the P frame), the MV0 of the forward reference frame list list0 may be filled into the motion information candidate list until the motion information candidate list is full.

In some embodiments, an MV in the candidate list may be scaled based on a plurality of scaling manners.

For example, as shown in FIG. 10, if an image frame to which the current block belongs is a unidirectional prediction encoding frame (e.g., the P frame), the current block may correspond to one reference frame list (i.e., a forward reference frame list (list0)). A reference frame in the forward reference frame list (list0) of the current block may be determined as a reference frame in time domain of the current block. In some embodiments, a reference frame with the smallest index in the forward reference frame list of the current block may be determined as the reference frame in time domain of the current block. After the reference frame in time domain of the current block is determined, a corresponding block T in the reference frame in time domain may be determined based on a position of a pixel in an upper left corner of the current block. Further, the motion information in time domain of the current block may be obtained by scaling the motion information of the corresponding block T based on a distance relationship between the corresponding block T and the current block. During scaling, assuming that a difference between a POC of the image frame including the current block and a POC of an image frame including the corresponding block is t1, a difference between the POC of the image frame including the corresponding block and the POC of a reference frame of the corresponding block is t2, and the motion information of the corresponding block is mv_col_f, the scaled motion information may be scalemy=mv_col_f*t1/t2. That is, the motion information in time domain of the current block is mv_col_f*t1/t2.

As another example, as shown in FIG. 11, if the image frame including the current block is a bidirectional prediction encoding frame (e.g., a B frame), the current block may correspond to two reference frame lists: a forward reference frame list (list0) and a backward reference frame list (list1). A reference frame in the forward reference frame list of the current block may be determined as a forward reference frame of the current block. In some embodiments, the reference frame with the smallest index in the forward reference frame list of the current block may be determined as the forward reference frame of the current block. After the forward reference frame of the current block is determined, the corresponding block T1 on the forward reference frame may be determined based on a position of a pixel in the upper left corner of the current block. Further, the forward motion information of the current block may be obtained by scaling the motion information of the corresponding block T1 based on the equation scalemv=mv_col_f*t1/t2.

In some embodiments, a reference frame in the backward reference frame list of the current block may be determined as the backward reference frame of the current block. In some embodiments, the reference frame with the smallest index in the backward reference frame list of the current block may be determined as the backward reference frame of the current block. After the backward reference frame of the current block is determined, a corresponding block T2 on the backward reference frame may be determined based on a position of a pixel in the upper left corner of the current block. Further, the backward motion information of the current block may be obtained by scaling the motion information of the corresponding block T2 based on the equation scalemv=mv_col_f*t1/t2.

In some embodiments, a length of the motion information candidate list may be 5, 10, or the like. In some embodiments, a maximum count of candidate MVs in the motion information candidate list of the current block may be reduced to reduce calculation cost and bit consumption in a prediction process. For example, the maximum count of the candidate MVs in the motion information candidate list of the current block may be at most 4, or even the maximum count of the candidate MVs in the motion information candidate list of the current block may be 3 or 2.

In some embodiments, predetermined motion information (e.g., zero motion information or (1,1), etc.) may be added to the motion information candidate list. In some embodiments, the scaled motion information obtained by scaling the motion information in the motion information candidate list may be added to the motion information candidate list. In some embodiments, an average value of at least two motion information in the motion information candidate list may be added to the motion information candidate list, which may increase the count of the motion information and improve the accuracy of prediction. A reference frame index of the predetermined motion information may be a POC closest to the POC to which the current block belongs, or the POC of any adjacent block.

In some embodiments, the motion information obtained by scaling the motion information in spatial domain or motion information in time domain corresponding to the reference frame index closest to the POC of the current block may be added to the motion information candidate list. For example, the scaled motion information may be obtained by scaling the motion information added to the motion information candidate list based on a magnification equation or a reduction equation. Further, an absolute value in the x-axis direction of the motion information to be scaled may be substituted into the magnification equation or the reduction equation corresponding to a range of the absolute value in the x-axis direction. Then a value in the x-axis direction of the scaled motion information may be obtained. An absolute value in the y-axis direction of the motion information to be scaled may be substituted into the magnification equation or the reduction equation corresponding to a range of the absolute value in the y-axis direction. Then a value in the y-axis direction of the scaled motion information may be obtained.

The magnification equation may be denoted as Equation (32) as follows:

$$\text{result} = \begin{cases} 8 & \text{temp} < 8 \\ A(\text{temp} * 5 + 2) \gg 2 & 8 \le \text{temp} \le 64 \\ A(\text{temp} * 9 + 4) \gg 3 & 64 < \text{temp} \le 128' \\ A(\text{temp} * 33 + 16) \gg 5 & 128 < \text{temp} \end{cases} \quad (32)$$

where result denotes the value in the x-axis direction or y-axis direction of the scaled motion information, A denotes a positive or negative attribute of the value in the x-axis direction or the value in the y-axis direction of the motion information to be scaled, and temp denotes the absolute value in the x-axis direction or y-axis direction of the motion information to be scaled.

The reduction equation may be denoted as Equation (33) as follows:

$$\text{result} = \begin{cases} -8 & \text{temp} < 8 \\ A(\text{temp} * 3 + 2) \gg 2 & 8 \le \text{temp} \le 64 \\ A(\text{temp} * 7 + 4) \gg 3 & 64 < \text{temp} \le 128 \\ A(\text{temp} * 31 + 16) \gg 5 & 128 < \text{temp} \end{cases} \quad (33)$$

In some embodiments, as shown in Equations (32) and (33), if the value in the x-axis direction of the motion information to be scaled is negative, A may be "−". If the value of the x-axis direction of the motion information to be scaled is positive, A may be "+". The width/height of the current block may be greater than or equal to N and less than or equal to M. N and M may be preset values, which may not be limited here, and N may be less than M. For example, N may be 8 or 16, or the like, and M may be 128 or 64, or the like.

In some embodiments, in the motion compensation, the width and the height of the two candidate sub-blocks may be larger than or equal to 4. In some embodiments, if the width and the height of the first rectangular sub-block obtained in the current division manner are larger than or equal to 4 and are even numbers, and the width and the height of the second rectangular sub-block are larger than or equal to 4 and are even numbers, the current division manner may be an available division manner. Otherwise, the current division manner may be unavailable. In some embodiments, an index value of an unavailable division mode may be increased such that an index value of at least one available division mode may be reduced, which may reduce the bit consumption for transmitting the index values of the division manners.

In some embodiments, the division manners in which the width and height of the two sub-blocks are not odd may be arranged forward. For example, if the current division manner is an unavailable division manner, the current division manner may be arranged at the end of a division manner list. That is, the index value of the current division manner may be increased to the maximum, and the division manner previously behind the current division manner may be arranged forward. As another example, after determining whether all the division manners are available, the division manners may be reordered such that all unavailable division manners may be arranged behind all available division manners. An order between the unavailable division manners may be the same as an order before reordering, and an order of the available division modes may be the same as an order before reordering.

In some embodiments, the motion compensation may be performed on the Y component and the CbCr component based on a same strategy. For example, for sub-blocks that satisfy certain size conditions, the motion compensation may be performed on the Y component and the CbCr component based on a same sub-block. In some embodiments, the width or the height of the sub-blocks in the motion compensation may be larger than or equal to 4. In some embodiments, since a size of the CbCr component is half less than a size of the Y component, the motion compensation may be performed on the Y component and the CbCr component based on different strategies. For example, if the width and the height of two sub-blocks are larger than or equal to 8, the motion compensation may be performed on the Y component and the CbCr component of each sub-block respectively, and then a prediction result of the current block may be obtained. If the width and the height of two sub-blocks are less than 8, the motion compensation may be performed on the Y component based on the sub-block, and the motion compensation may be performed on the CbCr component based on the whole block (i.e., the current block).

In 820, the processing device 1310 (e.g., the obtaining module 1420) may determine target motion compensation information in the motion compensation information corresponding to the plurality of division manners.

In 830, the processing device 1310 (e.g., the obtaining module 1420) may designate two candidate sub-blocks corresponding to the target motion compensation information as the two sub-blocks.

In some embodiments, all of the plurality of division manners may be traversed in turn, and costs of at least a portion of the plurality of division manners corresponding to all motion information combinations may be determined. Further, a target division manner (also referred to as an "optimal division mode") and a target motion information combination (also referred to as an "optimal motion information combination") may be determined based on the costs. In some embodiments, the costs of the at least a portion of the plurality of division manners corresponding to the all motion information combinations may be determined by traversing all of the plurality of division manners in turn based on the motion information candidate list. Further, the target division manner and the target motion information combination of the current block may be determined. For example, for the two candidate sub-blocks of the current block obtained based on the current division manner, the cost of all motion information combinations of the current division manner may be determined based on the motion information candidate list of the current block. The motion information combinations may include the motion information of the two candidate sub-blocks corresponding to each available division manner. For example, the current block is divided into a first candidate sub-block S1 and a second candidate sub-block S2 based on the division manner, the motion information candidate list may include MV0, MV1, and MV2, and the motion information of the first candidate sub-block S1 and the second candidate sub-block S2 may be different. All motion information combinations of the two sub candidate blocks may include six combinations: (S1-MV0, S2-MV1), (S1-MV0, S2-MV2), (S1-MV1, S2-MV0), (S1-MV1, S2-MV2) (S1-MV2, S2-MV0), and (S1-MV2, S2-MV1). In some embodiments, the prediction value of each candidate sub-block may be obtained by performing the motion compensation on each candidate sub-block based on the motion information of each candidate sub-block in the motion information combinations. The prediction value of the two candidate sub-blocks may be determined as the motion compensation information of the two candidate sub-blocks. After the motion compensation is performed on all the candidate sub-blocks, the prediction result of the current block may be obtained based on the prediction values of all candidate sub-blocks. The cost corresponding to the motion information combination may be determined based on the prediction result of the current block.

In some embodiments, the cost of all available division manners corresponding to all motion information combinations may be analyzed to determine the target division mode and the target motion information combination. In some embodiments, the available division manner and the motion information combination corresponding to the smallest cost may be determined as the target division mode and the target motion information combination of the current block. In some embodiments, the motion compensation information of the two candidate sub-blocks corresponding to the target division mode and the target motion information combination may be determined as the target motion compensation information. The two candidate sub-blocks obtained based on the target division mode and the target motion information combination corresponding to the target division mode may be determined as the two sub-blocks.

In some embodiments, the target division mode and the target motion information combination may be determined for each current block. In such cases, an incorrect prediction value of a current block with incomplete textures b caused when all current blocks are divided based on a unified division manner may be avoided, the textures of the current block may be predicted accurately, which may improve the prediction accuracy.

Figure 12:
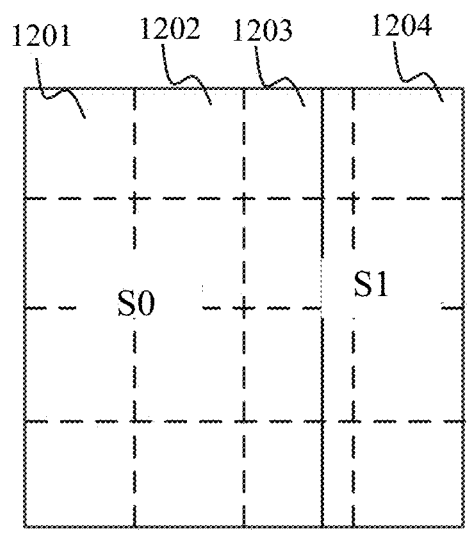
FIG. 12 is a schematic diagram illustrating exemplary unit blocks according to some embodiments of the present disclosure.

In some embodiments, the target motion information of the two sub-blocks may be determined and stored as a block with a size of 4×4. The target motion information may be used as reference motion information for encoding a next block or a next frame. For example, after the target division mode and target motion information combination of the current block is determined, the motion information of each unit block of the current block may be stored as the reference motion information for encoding a next block or a next frame. A size of the unit block may be 4×4. In some embodiments, if the unit block is completely located in a sub-block, the motion information of the sub-block where the unit block is located may be stored as the motion information of the unit block. If at least two portions of the unit block are located in at least two sub-blocks respectively, the motion information of one of the sub-blocks where the unit block is located may be stored as the motion information of the unit block. For example, FIG. 12 is a schematic diagram illustrating exemplary unit blocks according to some embodiments of the present disclosure. As shown in FIG. 12, the motion information of the sub-block S0 may be stored as the motion information of the unit blocks in a first column 1201 and a second column 1202. The motion information of the sub-block S0 may be stored as the motion information of the unit blocks in a third column 1230. The motion information of the sub-block S1 may be stored as the motion information of the unit blocks in a fourth column 1204. In some embodiments, the motion information of sub-block S1 may be stored as the motion information of the unit blocks in the third column 1203.

In some embodiments, the motion information of which sub-block is stored in each unit block in the current block may be determined according to equations. For example, for a unit block with a center position (x, y), and in the horizontal division in the rectangular division mode, the equation for determining the motion information may be denoted as: FirstPos= (ValidLen>>1)+Y*(ValidLen>>3). According to the equation, if (y<<1)≥FirstPos, the motion information of S1 in FIG. 12 may be stored; otherwise, the motion information of the S0 may be stored. As another example, in the vertical division in the rectangular division mode, the equation for determining the motion information may be denoted as: FirstPos=(ValidLen>>1)+Y*(ValidLen>>3). According to the equation, if (x<<1)≥FirstPos, the motion information of S1 may be stored; otherwise, the motion information of S0 may be stored. It should be understood that when the equations for determining the weight matrix of the first sub-block or second sub-block change, the equations for determining the motion information stored in the unit block may also change.

In some embodiments, when sizes of the two sub-blocks are different, the motion information of a larger sub-block may be stored as final motion information of the current block. For example, if two rectangular sub-blocks obtained in the rectangular division have different sizes, the motion information of the sub-block with the larger area may be stored as the motion information of all unit blocks in the current block.

In some embodiments, the prediction result of the current block may be determined based on the target prediction values of the two sub-blocks. The current block may be encoded based on the prediction result of the current block. In some embodiments, the index value of the prediction mode (i.e., the target division manner) corresponding to the prediction result may be encoded such that the index value may be obtained by the decoder. In some embodiments, the index value of the prediction mode corresponding to the prediction result may be encoded based on a truncated unary, which may reduce a count of bits of the prediction mode with a small index value in the code stream and reduce the bit consumption. In some embodiments, when a total count of prediction modes of the current block is less than or equal to 6, the truncated unary may be used to encode the index value of the prediction mode, which may ensure that the count of bits of each prediction mode in the code stream is less than or equal to 6, and reduce the count of bits corresponding to the index value when the prediction mode is small.

In some embodiments, a first syntax element may be added to a sequence header to indicate whether all image frames of a sequence have been predicted according to the inter prediction of the present disclosure. For example, as shown in Table 5, the first syntax element may be reg_enable_flag, which may be a binary variable. A value of 1 may indicate that all image frames of the sequence were predicted according to the inter prediction of the present disclosure, and a value of 0 may indicate that all image frames of the sequence were not predicted according to the inter prediction of the present disclosure.

TABLE 5

|  | descriptor |
|---|---|
| Definition for a sequence header<br> if (profile_id == 0x32) {<br>  reg_enable_flag<br> } | u(1) |

In some embodiments, a second syntax element may also be added to an encoding result of the current block to indicate whether the current block is predicted according to the inter prediction of the present disclosure. For example, as shown in Table 6, the second syntax element may be reg_flag, which is a CU-level regular geometric prediction mode flag. A value of 1 may indicate that the current block may be predicted according to the inter prediction of the present disclosure. A value of 0 may indicate that the current block may not be predicted according to the inter prediction of the present disclosure. The value of RegFlag may be equal to reg_flag.

TABLE 6

|  | descriptor |
|---|---|
| Definition for an encoding unit<br> if ((SkipFlag \|\| DirectFlag) && RegFlag) {<br>  reg_idx<br>  reg_cand_idx0<br>  reg_cand_idx1<br> } | ae(v)<br>ae(v)<br>ae(v) |

In some embodiments, an encoding syntax may be reg_idx, which may represent an index mode used in the encoding process. In some embodiments, a truncated binary binarization may be used for reg_idx, with a value range of 0~13. If reg_idx does not exist in a bitstream, a value of reg_idx may be 0. Truncated binary encoding is an entropy encoding suitable for symbols with uniform distribution. When a count of symbols is not an integer power of 2, the truncated binary encoding may shorten an average code length compared with the ordinary binary encoding with a fixed length. The encoding syntax of the index value of the motion information of a first sub-block may be reg_cand_idx0, which may indicate an order of the motion information in the motion information candidate list. And a truncated unary binarization may be used for the encoding syntax of the index value, with a range 0~B. If reg_cand_idx0 does not exist in the bitstream, a value of reg_cand_idx0 may be 0. The encoding syntax of an index value of the motion information of a second sub-block may be reg_cand_idx1, which may indicate an order of motion information in the motion information candidate list. The truncated unary binarization may be used for the encoding syntax, with a range of 0~b−1. If reg_cand_idx1 does not exist in the bitstream, a value of reg_cand_idx1 may be 0. The encoding syntax of the motion information index value of an a−1-th sub-block in the motion information combination may be reg_cand_idx a−1, which may indicate an order of motion information in the motion information candidate list. The truncated unary binarization may be used for the encoding syntax, with a range of 0~ b-a+1. If reg_cand_idx a−1 does not exist in the bitstream, a value of reg_cand_idx a−1 may be 0. Unary is a simple method for binarization. For a non-negative integer N, the unary of N may include N 1s and one 0. For example, if N equals 5, the unary may be 111110 (5 1s and one 0). If N equals 0, the unary may be 0. Truncated unary is a variant of unary. When the maximum value Nmax of the symbol to be encoded is known, assuming that a current symbol to be encoded is a non-negative integer N, if N is less than Nmax, the truncated unary may be the unary. If N equals Nmax, the truncated unary may include N 1s. For example, in Nmax equals 5, and N equals 3, the truncated unary may be 1110. As another example, if N equals 5, the truncated unary may be 11111.

In some embodiments, the inter prediction based on Merge mode may be applied to AVS3 (Audio Video coding standard 3). AVS3 is the third generation video coding standard formulated by China AVS working group, which may be used for application scenarios such as UHD TV broadcasting, VR, video monitoring, or the like.

In some embodiments, the inter prediction of the present disclosure may be used to process the screen content obtained by screen recording. For example, for the screen content obtained by screen recording, the equation for determining the reference weight ReferenceWeights [x] may be modified as ReferenceWeights [x]=Clip 3 [0, 8, (x-FirstPos−3)/4]. And to determine the motion information stored in the unit block, the equation for determining FirstPos may be modified as:

FirstPos=(ValidLen>>1)+3+$Y$*(ValidLen>>3).

In a test scheme of the inter prediction based on the Merge mode according to some embodiments of the present disclosure, the horizontal division and the vertical division were used to divide a current block. Each of the horizontal division and the vertical division corresponds to three division manners. The test scheme was performed based on a configuration of LDP, with an anchor of a reference software HPM10.0 of AVS3, and using general test data set of AVS3. In the test scheme, bd-rate performances of three components of YUV (i.e., Y, Cr, Cb) are −0.3%, −0.67%, and −0.72%, respectively, wherein a sign of minus indicates that a code rate is saved without reducing the encoding quality.

Figure 13:
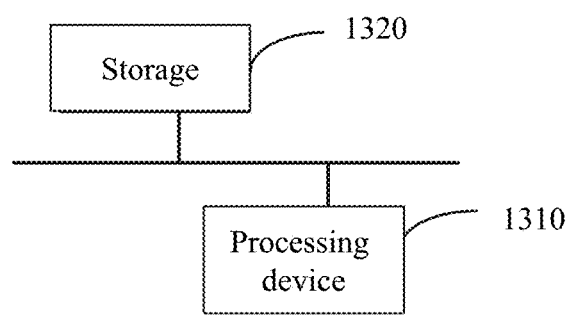
FIG. 13 is a schematic diagram illustrating an exemplary frame prediction device according to some embodiments of the present disclosure.

FIG. 13 is a schematic diagram illustrating an exemplary frame prediction device according to some embodiments of the present disclosure. In some embodiments, the frame prediction system 100 may be implemented by software and/or hardware, and/or may be integrated in the frame prediction device 1300.

As shown in FIG. 13, the frame prediction device 1300 may include a processing device 1310 (also referred to as a processor). The processing device may be configured to process information and/or data relating to the frame prediction to perform one or more functions described in the present disclosure. For example, the processing device 1310 may be configured to implement any one of the embodiments or any combination thereof in the present disclosure.

In some embodiments, the processing device 1310 may include a central processing unit (CPU). In some embodiments, the processing device 1310 may include an integrated circuit chip configured to process signals. In some embodiments, the processing device 1310 may include a general-purpose processor, a digital signal processor (DSP), an application specific integrated circuit (ASIC), a field programmable gate array (FPGA), other programmable logic device, a discrete gate, a transistor logic device, a discrete hardware component, or the like, or any combination thereof. The general-purpose processor may include a microprocessor. In some embodiments, the processing device 1310 may include any conventional processor.

In some embodiments, the frame prediction device 1300 may include a storage 1320. The storage 1320 may be configured to store instructions and/or data required for operations of the processing device 1310. In some embodiments, the storage 1320 may include a medium that may store program codes, such as a U disk, a mobile hard disk, a read-only memory (ROM), a random access memory (RAM), a magnetic disk, an optical disk, or the like, or any combination thereof. In some embodiments, the storage 1320 may include terminal devices such as a computer, a server, a mobile phone, a tablet, or the like, or any combination thereof.

FIG. 14 is a block diagram illustrating an exemplary processing device according to some embodiments of the present disclosure. In some embodiments, the processing device 1310 may be implemented on various devices (e.g., a computing device used to implement any component of the frame prediction system 100). As shown in FIG. 14, the processing device 1300 may include a prediction condition determination module 1410, an obtaining module 1420, and a prediction result determination module 1430.

The prediction condition determination module 1410 may be configured to determine whether a current block in an image frame satisfies a division condition. In some embodiments, the image frame may be a current frame in a video or an image sequence that is to be compressed and includes multiple image frames. The division condition refers to a condition for dividing the current block if the condition is satisfied. For example, the prediction condition determination module 1410 may be configured to determine a type of the image frame based on the GOP. For the image frame that is not the I frame (e.g., a P frame, a B frame, etc.), the prediction condition determination module 1410 may determine whether the width and/or the height is in the range from M to N. In response to determining that the width and/or the height is in the range from M to N, the prediction condition determination module 1410 may determine that the current block satisfies the division condition.

The obtaining module 1420 may be configured to obtain two sub-blocks by dividing the current block according to a division mode in response to determining that the current block satisfies the division condition. In some embodiments, the division mode may include a horizontal division, a vertical division, and a diagonal division. In some embodiments, the division mode may include a plurality of division manners. Each of the plurality of division manners corresponds two candidate sub-blocks. For example, in each division manner, the obtaining module 1420 may divide the current block into two candidate sub-blocks according to a weight matrix or a step size. To obtain the two sub-blocks, for each two candidate sub-blocks corresponding to one of the plurality of division manners, the obtaining module 1420 may obtain motion compensation information of the two candidate sub-blocks by performing a motion compensation on the two candidate sub-blocks. For example, for two candidate sub-blocks obtained according to an inclined division (e.g., a division manner corresponding to a division angle that is not 90 degrees or 180 degrees), the obtaining module 1420 may perform the motion compensation on the two candidate sub-blocks based on a rectangular division converted from the inclined division. Further, the obtaining module 1420 may determine target motion compensation information in the motion compensation information corresponding to the plurality of division manners. For example, the obtaining module 1420 may traverse all of the plurality of division manners in turn, and determine costs of at least a portion of the plurality of division manners corresponding to all motion information combinations. The obtaining module 1420 may further determine a target division manner and a target motion information combination based on the costs. The obtaining module 1420 may further determine the motion compensation information of the two candidate sub-blocks corresponding to the target division mode and the target motion information combination as the target motion compensation information. Further, the obtaining module 1420 may designate two candidate sub-blocks corresponding to the target motion compensation information as the two sub-blocks.

The prediction result determination module 1430 may be configured to determine, based on the two sub-blocks, a prediction result of the current block. In some embodiments, to determine the prediction result of the current block, the prediction result determination module 1430 may obtain motion compensation information of the two sub-blocks by performing, based on the rectangular division, a motion compensation on the two sub-blocks. Further, the prediction result determination module 1430 may determine, based on the motion compensation information and the inclined division, target prediction values of the two sub-blocks. Further, the prediction result determination module 1430 may determine, based on the target prediction values of the two sub-blocks, the prediction result of the current block.

In some embodiments, to determine the prediction result of the current block, the prediction result determination module 1430 may obtain two predicted sub-blocks corresponding to the two sub-blocks. The prediction result determination module 1430 may further obtain filtered pixel values by performing a first filtering operation on pixel values at a junction region of the two predicted sub-blocks. Further, the prediction result determination module 1430 may designate the filtered pixel values as target prediction values of the two predicted sub-blocks and determine, based on the target prediction values of the two sub-blocks, the prediction result of the current block.

embodiments, to obtain the two predicted sub-blocks, the prediction result determination module 1430 may obtain motion compensation information of the two sub-blocks by performing, based on the rectangular division, a motion compensation on the two sub-blocks. Further, the prediction result determination module 1430 may determine, based on the motion compensation information and the inclined division, target prediction values of the two sub-blocks. Further, the prediction result determination module 1430 may obtain two updated sub-blocks corresponding to the two sub-blocks by performing, based on the target prediction values of the two sub-blocks, a second filter operation on the two sub-blocks, and designate the two updated sub-blocks as the two predicted sub-blocks.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 1310 may include one or more additional modules, such a storage module (not shown) for storing data.

Figure 15:
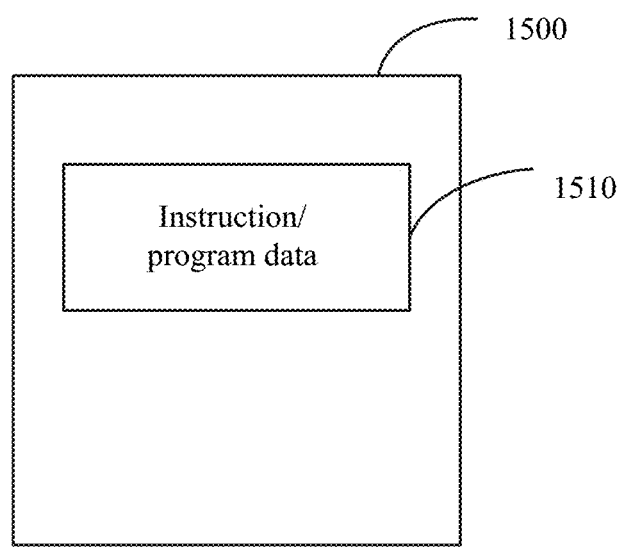
FIG. 15 is a schematic diagram illustrating an exemplary computer-readable storage medium according to some embodiments of the present disclosure.

FIG. 15 is a schematic diagram illustrating an exemplary computer readable storage medium according to some embodiments of the present disclosure. The computer readable storage medium 1500 may include a non-transitory computer readable medium. The computer readable storage medium 1500 may be configured to store instruction/program data 1510. When the instruction/program data 1510 is executed (e.g., by the processing device 1310), any one of the embodiments of the inter prediction method and/or the video encoding method or any combination thereof may be implemented. In some embodiments, the instruction/program data 1510 may be in a form of a program file and stored in the storage 1320 in a form of a software product. A computer device (e.g., personal computer, a server, or a network device, etc.) or a processor may perform all or part of the operations of the embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, the system components may be implemented by hardware, also may be implemented merely by software, such as installing the system on existing servers or mobile devices.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in claim. Rather, claim subject matter lies in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate+20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should consider specified significant digits and adopt ordinary rounding techniques. Notwithstanding that the numerical ranges and parameters configured to illustrate the broad scope of some embodiments of the present disclosure are approximations, the numerical values in specific examples may be as accurate as possible within a practical scope.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. A system for inter prediction based on a Merge mode, comprising:
   at least one storage medium including a set of instructions; and
   at least one processor in communication with the at least one storage medium, wherein when executing the set of instructions, the at least one processor is directed to cause the system to:
      determine whether a current block in an image frame satisfies a division condition, the division condition being that at least one of a width or a height of the current block is in a range from M to N when the image frame is not an I frame;
      in response to determining that the current block satisfies the division condition, obtain two sub-blocks by dividing the current block according to a division mode, wherein the division mode includes a rectangular division, the rectangular division is converted from an inclined division, and division angles of the inclined division are not 90 degrees or 180 degrees;
      wherein to obtain the two sub-blocks by dividing the current block according to a division mode, the at least one processor is directed to cause the system to:
         obtain two intermediate sub-blocks by dividing the current block according to the inclined division;
         determine a count of pixels of at least one of the two intermediate sub-blocks;
         determine heights or widths of the two sub-blocks after the conversion based on the count of pixels and the division mode of the rectangular division;
         obtain the two sub-blocks based on the heights or the widths of the two sub-blocks after the conversion; and
      determine, based on the two sub-blocks, a prediction result of the current block.

2. The system of claim 1, wherein the two sub-blocks include a first rectangular sub-block and a second rectangular sub-block, to determine, based on the two sub-blocks, the prediction result of the current block, the at least one processor is directed to cause the system further to:
   obtain motion compensation information of the two sub-blocks by performing, based on the rectangular division, a motion compensation on the two sub-blocks, including;
      obtaining first motion information and second motion information from a motion information candidate list that includes basic motion information and extended motion information, the basic motion information including at least one of motion information in time domain, motion information in spatial domain, or history-based motion vector prediction (HMVP), the extended motion information being obtained by performing an offset operation on the basic motion information based on an offset distance and an offset direction, wherein the offset direction refers to a direction in which a position of the current block moves relatively to a previous frame in space and includes at least one of up, down, left, right, upper left, upper right, lower left and lower right, the offset distance refers to how many times of pixel accuracy of the current block changes relatively to a corresponding position of the previous frame in space and includes ¼ pixel accuracy, ½ pixel accuracy, 1 pixel accuracy, 2 times of pixel accuracy, 4 times of pixel accuracy, 8 times of pixel accuracy, 16 times of pixel accuracy and 32 times of pixel accuracy;

obtaining the motion compensation information of the first rectangular sub-block and the second rectangular sub-block by performing the motion compensation on the first rectangular sub-block and the second rectangular sub-block based on the first motion information and the second motion information, respectively, the motion compensation information of the two sub-blocks including a prediction value of the first rectangular sub-block and a prediction value of the second rectangular sub-block;

determine, based on the motion compensation information and the inclined division, target prediction values of the two sub-blocks; and determine, based on the target prediction values of the two sub-blocks, the prediction result of the current block.

3. The system of claim 1, wherein to determine, based on the two sub-blocks, a prediction result of the current block, the at least one processor is directed to cause the system further to:

obtain two predicted sub-blocks corresponding to the two sub-blocks;

obtain filtered pixel values by performing a first filtering operation on pixel values at a junction region of the two predicted sub-blocks;

designate the filtered pixel values as target prediction values of the two predicted sub-blocks; and determine, based on the target prediction values of the two sub-blocks, the prediction result of the current block.

4. The system of claim 3, wherein to obtain filtered pixel values of the two predicted sub-blocks by performing a first filtering operation on pixel values at a junction of the two predicted sub-blocks, the at least one processor is directed to cause the system to:

filter, based on a tap filter, the pixel values at the junction of the two predicted sub-blocks, wherein coefficients of the tap filter include {1, 2, 1}.

5. The system of claim 3, wherein to obtain two predicted sub-blocks corresponding to the two sub-blocks, the at least one processor is directed to cause the system to:

obtain motion compensation information of the two sub-blocks by performing, based on the rectangular division, a motion compensation on the two sub-blocks;

determine, based on the motion compensation information and the inclined division, target prediction values of the two sub-blocks;

obtain two updated sub-blocks corresponding to the two sub-blocks by performing, based on the target prediction values of the two sub-blocks, a second filter operation on the two sub-blocks; and designate the two updated sub-blocks as the two predicted sub-blocks.

6. The system of claim 1, wherein the division mode includes at least one of a horizontal division, a vertical division, or a diagonal division.

7. The system of claim 1, wherein the division mode is adjustable according to operations including:

adjusting an effective length of a reference weight matrix in the division mode, the effective length is determined based on the height, the width, and a prediction angle of the current block; and adjusting the division mode based on the adjusted effective length.

8. The system of claim 1, wherein the system is applied to the third generation audio video coding standard (AVS3).

9. The system of claim 1, wherein the division mode includes a plurality of division manners, each of the plurality of division manners corresponds to two candidate sub-blocks, and to obtain two sub-blocks by dividing the current block according to the division mode, the at least one processor is directed to cause the system to:

for each two candidate sub-blocks corresponding to one of the plurality of division manners, obtain motion compensation information of the two candidate sub-blocks by performing, based on the rectangular division, a motion compensation on the two candidate sub-blocks;

determine target motion compensation information in the motion compensation information corresponding to the plurality of division manners; and designate two candidate sub-blocks corresponding to the target motion compensation information as the two sub-blocks.

10. The system of claim 9, wherein the plurality of division manners correspond to a plurality of step sizes, the plurality of step sizes relating to division differences between the plurality of division manners.

11. A method for inter prediction based on a Merge mode, implemented on a computing device including at least one processor and at least one storage, comprising:

determining whether a current block in an image frame satisfies a division condition, the division condition being that at least one of a width or a height of the current block is in a range from M to N when the image frame is not an I frame;

in response to determining that the current block satisfies the division condition, obtaining two sub-blocks by dividing the current block according to a division mode, wherein the division mode includes a rectangular division, the rectangular division is converted from an inclined division, and division angles of the inclined division are not 90 degrees or 180 degrees;

wherein the obtaining two sub-blocks by dividing the current block according to the division mode including:

obtaining two intermediate sub-blocks by dividing the current block according to the inclined division;

determining a count of pixels of at least one of the two intermediate sub-blocks;

determining heights or widths of the two sub-blocks after the conversion based on the count of pixels and the division mode of the rectangular division;

obtaining the two sub-blocks based on the heights or the widths of the two sub-blocks after the conversion; and determining, based on the two sub-blocks, a prediction result of the current block.

12. A non-transitory computer readable medium, comprising executable instructions that, when executed by at least one processor, direct the at least one processor to perform a method, the method comprising:

determining whether a current block in an image frame satisfies a division condition, the division condition being that at least one of a width or a height of the current block is in a range from M to N when the image frame is not an I frame;

in response to determining that the current block satisfies the division condition, obtaining two sub-blocks by dividing the current block according to a division mode, wherein the division mode includes a rectangular division, the rectangular division is converted from an inclined division, and division angles of the inclined division are not 90 degrees or 180 degrees;

wherein the obtaining the two sub-blocks by dividing the current block according to a division mode including:
- obtaining two intermediate sub-blocks by dividing the current block according to the inclined division;
- determining a count of pixels of at least one of the two intermediate sub-blocks;
- determining heights or widths of the two sub-blocks after the conversion based on the count of pixels and the division mode of the rectangular division;
- obtaining the two sub-blocks based on the heights or the widths of the two sub-blocks after the conversion; and determining, based on the two sub-blocks, a prediction result of the current block.

* * * * *